(12) United States Patent
Jiang et al.

(10) Patent No.: US 10,816,328 B2
(45) Date of Patent: Oct. 27, 2020

(54) FAR INFRARED IMAGING SYSTEM

(71) Applicants: Tsinghua University, Beijing (CN); HON HAI PRECISION INDUSTRY CO., LTD., New Taipei (TW)

(72) Inventors: Li-juan Jiang, Beijing (CN); Peng Liu, Beijing (CN); Duan-Liang Zhou, Beijing (CN); Chun-Hai Zhang, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 112 days.

(21) Appl. No.: 16/212,923

(22) Filed: Dec. 7, 2018

(65) Prior Publication Data

US 2019/0242695 A1 Aug. 8, 2019

(30) Foreign Application Priority Data

Feb. 5, 2018 (CN) .......................... 2018 1 0109285

(51) Int. Cl.
*G01J 4/00* (2006.01)
*G01B 11/24* (2006.01)
(Continued)

(52) U.S. Cl.
CPC .............. *G01B 11/24* (2013.01); *G01B 11/03* (2013.01); *G02B 5/3025* (2013.01); *G02B 27/286* (2013.01); *H05B 3/22* (2013.01)

(58) Field of Classification Search
CPC ...... G01B 11/24; G01B 11/03; G02B 5/3025; G02B 27/286; H05B 3/22
See application file for complete search history.

(56) References Cited

U.S. PATENT DOCUMENTS

2009/0052029 A1 2/2009 Dai et al.
2009/0072706 A1 3/2009 Feng et al.
(Continued)

FOREIGN PATENT DOCUMENTS

CN 1975550 A 6/2007
CN 101963681 A 2/2011
(Continued)

*Primary Examiner* — David P Porta
*Assistant Examiner* — Mamadou Faye
(74) *Attorney, Agent, or Firm* — ScienBiziP, P.C.

(57) ABSTRACT

A far infrared imaging system includes a first far infrared polarized light generator, a second far infrared polarized light generator, a first receiving device, a second receiving device, and a computer. The first far infrared polarized light generator emits a first far infrared polarized light, and the second far infrared polarized light generator emits a second far infrared polarized light. The first receiving device receives a first far infrared reflected polarized light, and the second receiving device receives a second far infrared reflected polarized light. The computer processes information received by the first receiver and the second receiver. The polarizer of the first far infrared polarized light generator and the second far infrared polarized light generator includes a carbon nanotube structure including a plurality of carbon nanotubes arranged substantially along the same direction.

20 Claims, 27 Drawing Sheets

(51) Int. Cl.
G02B 27/28 (2006.01)
H05B 3/22 (2006.01)
G01B 11/03 (2006.01)
G02B 5/30 (2006.01)

(56) References Cited

U.S. PATENT DOCUMENTS

| | | |
|---|---|---|
| 2011/0019273 A1 | 1/2011 | Feng et al. |
| 2012/0070625 A1 | 3/2012 | Liu et al. |
| 2014/0183158 A1 | 7/2014 | Chao et al. |
| 2017/0096339 A1* | 4/2017 | He .................... B01D 71/021 |
| 2017/0219754 A1* | 8/2017 | Di .................... G02F 1/133528 |

FOREIGN PATENT DOCUMENTS

| | | |
|---|---|---|
| CN | 107233078 A | 10/2017 |
| TW | 200837403 A | 9/2008 |
| TW | 200915374 A | 4/2009 |
| TW | 201425216 A | 7/2014 |

\* cited by examiner

FAR INFRARED IMAGING SYSTEM

CROSS-REFERENCE TO RELATED APPLICATIONS

This application claims all benefits accruing under 35 U.S.C. § 119 from China Patent Application No. 201810109285.0, filed on Feb. 5, 2018, in the China Intellectual Property Office, the disclosure of which is incorporated herein by reference.

BACKGROUND

1. Technical Field

The present disclosure relates to light polarization technology and application thereof, specifically, to far infrared light polarization technology and application thereof.

2. Description of Related Art

Light is an electromagnetic wave. Generally, when the light goes forward, the direction of electromagnetic vibration is in all directions. If the electromagnetic vibration only occurs in one plane, the directions of electric field vibration and magnetic field vibration are of the light are fixed. Light with a fixed vibration direction of electric and magnetic is called polarized light. The direction of electric field of the polarized light is called the polarization direction of the light. A polarizer absorbs linearly polarized light in a certain direction and to output linearly polarized light perpendicular to the polarizer. A polarizer can selectively polarize light in a particular direction. All or part of the polarized light can pass through the other polarizer, depending on the direction of the other polarizer. Polarizers have been widely used in lighting, cameras, sunglasses, and 3D movies.

Usually, the degree of polarization is used to describe the polarized light. When the polarized light is used to illuminate, many factors in the illumination system may affect the polarization state. Important factors include the intrinsic birefringence and stress birefringence of optical materials, which reduces the degree of polarization of light. In addition, the polarization properties of optical thin films and the reflection and refraction of light at the interface of the polarizers will also affect the polarization of light. In a illumination system of the polarized light, it is desirable that the outputted linearly polarized light be kept in high degree of polarization due to the need of polarization control.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
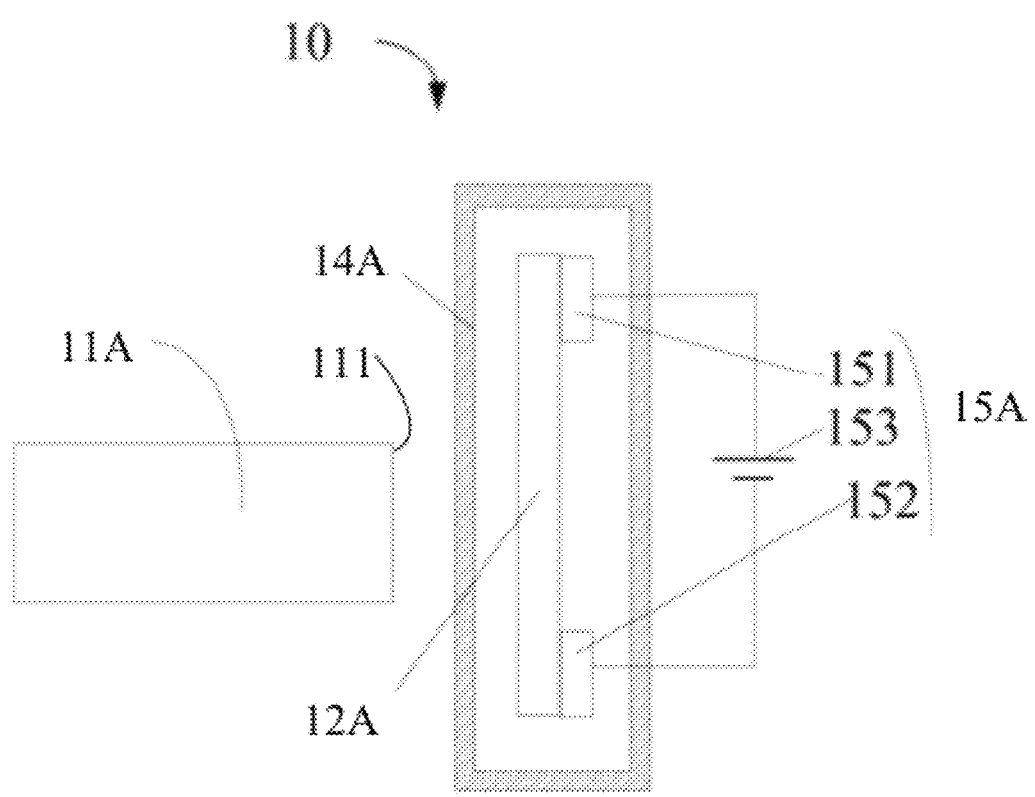
FIG. 1 is a schematic section view of one embodiment of a far infrared polarized light generator.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated better illustrate details and features. The description is not to considered as limiting the scope of the embodiments described herein.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

References will now be made to the drawings to describe, in detail, various embodiments of the present generators and methods for generating far infrared polarized light.

The inventor of instant application discovered that the degree of polarization (DOP) and transmission of the far infrared light can be adjusted by heating the carbon nanotube polarizer as the far infrared light passing through a carbon nanotube polarizer. The carbon nanotube polarizer is a carbon nanotube structure including a plurality of carbon nanotubes arranged substantially along the same direction. The degree of polarization and transmission of the far infrared light can be increased by increasing the temperature of the carbon nanotube structure. Test results of the present disclosure shows that when the polarizer is a carbon nanotube structure of two stacked drawn carbon nanotube films, the degree of polarization of the far infrared light is 40% when the carbon nanotube structure is at room temperature of 300K, and the degree of polarization of the far infrared light is increased to 70% when the carbon nanotube structure is heated to a temperature of 641K.

Referring to FIG. 1, a far infrared polarized light generator 10 of one embodiment is disclosed The far infrared polarized light generator 10 includes a far infrared light source 11A, a polarizer 12A located on the side of a light emitting surface 111 of the far infrared light source 11A, a vacuum chamber 14A, and a heater 15A. The far infrared light source 11A is adapted to emit far infrared light. The far infrared light emitted from the far infrared light source 11A passes through the polarizer 12A to form a far infrared polarized light. The heater 15A is adapted to heat the polarizer 12A.

The far infrared light source 11A can be a thermal radiation infrared light source, a gas discharge infrared light source, or a laser infrared light source. In one embodiment, the far infrared light source 11A is a made of Mercury grown at low temperature.

Figure 2:
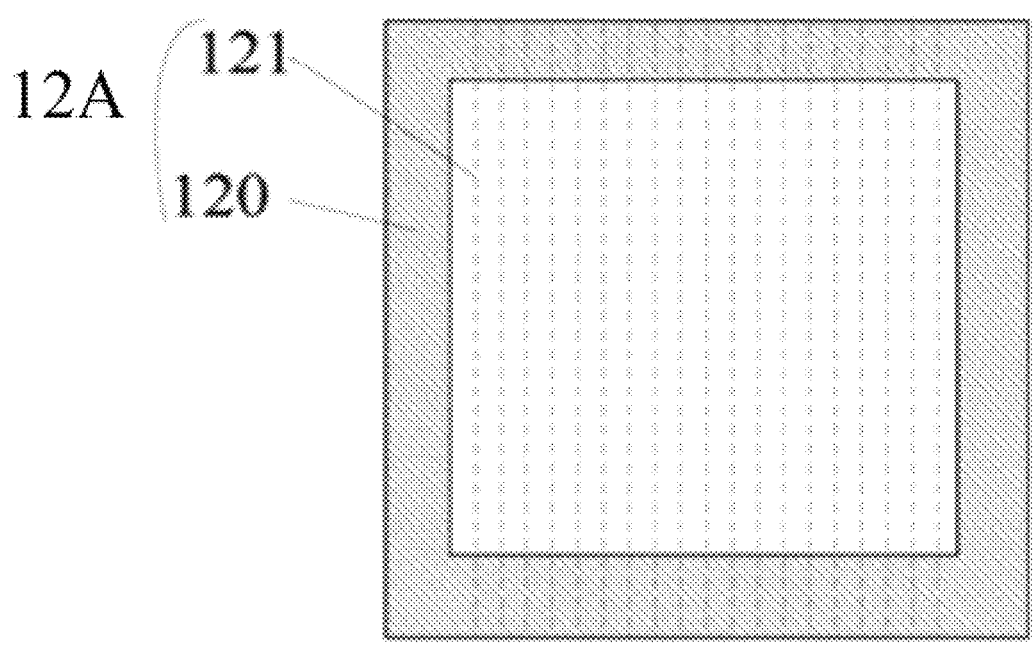
FIG. 2 is a schematic section view of one embodiment of a polarizer.

Referring to FIG. 2, the polarizer 12A includes a frame 120 and a carbon nanotube structure 121. The shape and the size of the frame 120 is not limited and can be selected as needed. The material of the frame 120 can be metal, polymer, glass, ceramic, or wood. The frame 120 defines an opening. The carbon nanotube structure 121 is attached on the frame 120 to cover the opening. The middle portion of the carbon nanotube structure 121 is suspended through the opening. The carbon nanotube structure 121 can be fixed on the frame 120 by adhesive. The carbon nanotube structure 121 can be in direct contact with the light emitting surface 111 or spaced apart from the light emitting surface 111. The frame 120 can be omitted when the carbon nanotube structure 121 is in direct contact with the light emitting surface 111.

The carbon nanotube structure 121 is a free-standing structure. The term "free-standing structure" indicates that the carbon nanotube structure 121 can sustain its own weight when the carbon nanotube structure 121 is hoisted by a portion thereof without causing damages to a structural integrity of the carbon nanotube structure 121. Thus, the carbon nanotube structure 121 can be suspended by two spaced apart supports. The carbon nanotube structure 121 includes a plurality of carbon nanotubes arranged substantially along the same direction and a plurality of gaps between the plurality of carbon nanotubes. The plurality of carbon nanotubes are orderly arranged to form an ordered carbon nanotube structure. The plurality of carbon nanotubes extend along a direction substantially parallel to the surface of the carbon nanotube structure 121. The term 'ordered carbon nanotube structure' includes, but is not limited to, a structure wherein the plurality of carbon nanotubes are arranged in a consistently systematic manner, e.g., the plurality of carbon nanotubes are arranged approximately along the same direction. The plurality of carbon nanotubes can be single-walled carbon nanotubes, double-walled carbon nanotubes, or multi-walled carbon nanotubes. The length and the diameter of the plurality of carbon nanotubes can be selected according to need. The diameter of the single-walled carbon nanotubes can be in a range from about 0.5 nanometers to about 10 nanometers. The diameter of the double-walled carbon nanotubes can be in a range from about 1.0 nanometer to about 15 nanometers. The diameter of the multi-walled carbon nanotubes can be in a range from about 1.5 nanometers to about 50 nanometers. The length of the plurality of carbon nanotubes can be in a range of about 200 micrometers to about 900 micrometers. The average width of the plurality of gaps can be in a range of about 100 nanometers to about 200 micrometers.

The carbon nanotube structure 121 can include a single carbon nanotube film or two or more carbon nanotube films stacked together. The carbon nanotube structure 121 can also include a layer of parallel and spaced apart carbon nanotube wires. The carbon nanotube wire can be a twisted carbon nanotube wire or an untwisted carbon nanotube wire. It is understood that carbon nanotube structure disclosed above can be used with all embodiments disclosed herein.

Figure 3:
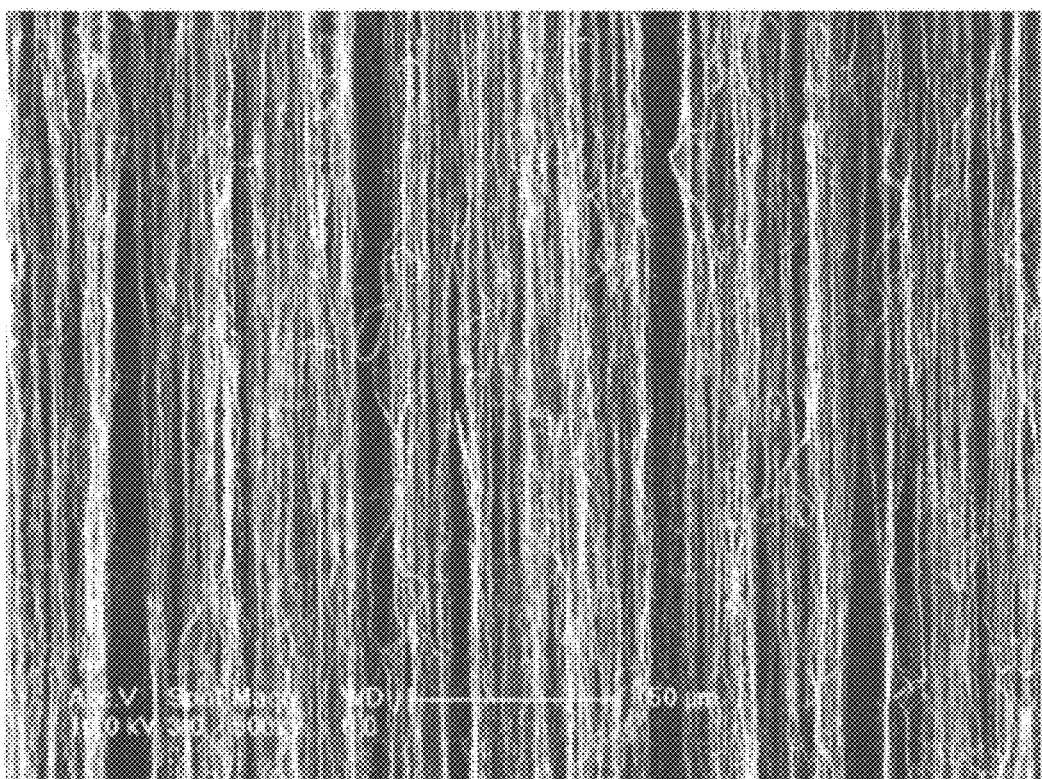
FIG. 3 is a Scanning Electron Microscope (SEM) image of a drawn carbon nanotube film.

In one embodiment, the carbon nanotube structure 121 includes at least one drawn carbon nanotube film. The drawn carbon nanotube film can be drawn from a carbon nanotube array that configured to have a film drawn therefrom. The drawn carbon nanotube film includes a plurality of successive and oriented carbon nanotubes joined end-to-end and side-by-side by van der Waals attractive force therebetween. The drawn carbon nanotube film is a free-standing film. Referring to FIG. 3, each drawn carbon nanotube film includes a plurality of successively oriented carbon nanotube segments joined end-to-end and side-by-side by van der Waals attractive force therebetween. Each carbon nanotube segment includes a plurality of carbon nanotubes parallel to each other, and combined by van der Waals attractive force therebetween. As can be seen in FIG. 3, some variations can occur in the drawn carbon nanotube film. The carbon nanotubes in the drawn carbon nanotube film are predominately oriented along a preferred orientation. The drawn carbon nanotube film can be treated with an organic solvent to increase the mechanical strength and the toughness and to reduce the coefficient of friction of the drawn carbon nanotube film. A thickness of the drawn carbon nanotube film can range from about 0.5 nanometers to about 100 micrometers. The drawn carbon nanotube film comprises a plurality of gaps between adjacent carbon nanotubes.

The carbon nanotube structure 121 can include at least two stacked drawn carbon nanotube films. In other embodiments, the carbon nanotube structure 121 can include two or more coplanar carbon nanotube films, and can include layers of coplanar carbon nanotube films. When the carbon nanotubes in the carbon nanotube film are predominately aligned along a preferred orientation (e.g., the drawn carbon nanotube film), an angle can exist between the preferred orientations of adjacent carbon nanotube films, whether stacked or adjacent. Adjacent carbon nanotube films can be combined by mainly the van der Waals attractive force therebetween. The lengthwise directions of the carbon nanotubes in two adjacent carbon nanotube films can are substantially coplanar and parallel to each other. Stacking the carbon nanotube films will also add to the structural integrity of the carbon nanotube structure 121.

Figure 4:
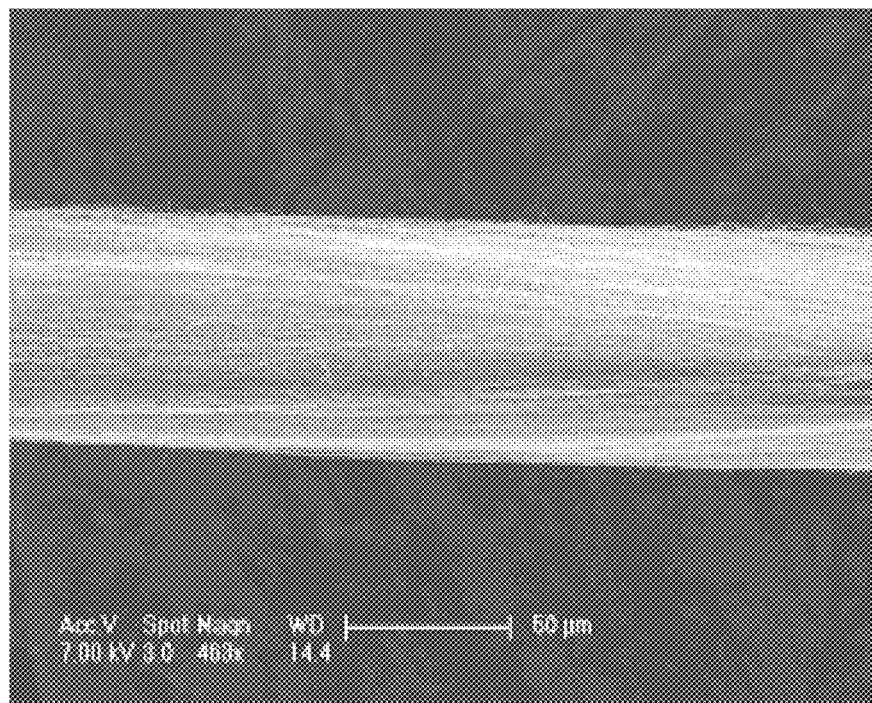
FIG. 4 is a SEM image of an untwist carbon nanotube wire.

Treating the drawn carbon nanotube films with a volatile organic solvent can form the untwisted carbon nanotube wire. Specifically, the organic solvent is applied to soak the surface of the drawn carbon nanotube film. During the soaking, adjacent parallel carbon nanotubes in the drawn carbon nanotube films will bundle together, due to the surface tension of the organic solvent as the solvent volatilizes, and thus, the drawn carbon nanotube films will be shrunk into an untwisted carbon nanotube wire. Referring to FIG. 4, the untwisted carbon nanotube wire includes a plurality of carbon nanotubes substantially oriented along the same direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end and side by side by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity, and shape. The length of the untwisted carbon nanotube wire can be arbitrarily set as desired. A diameter of the untwisted carbon nanotube wire ranges from about 0.5 nanometers to about 100 micrometers.

Figure 5:
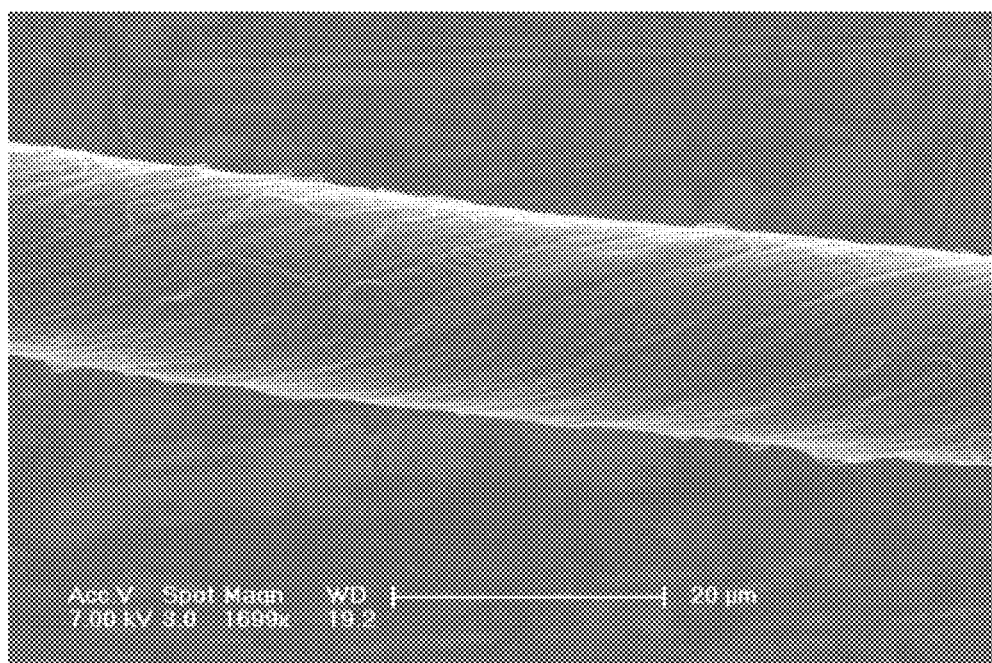
FIG. 5 is a SEM image of a twist carbon nanotube wire.

The twisted carbon nanotube wire can be formed by twisting a drawn carbon nanotube film by applying a mechanical force to twist the two ends of the drawn carbon nanotube film in opposite directions. Referring to FIG. 5, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end and side by side by van der Waals attractive force therebetween. Each carbon nanotube segment includes a plurality of carbon nanotubes parallel to each other, and combined by van der Waals attractive force therebetween. The length of the carbon nanotube wire can be set as desired. A diameter of the twisted carbon nanotube wire can be from about 0.5 nanometers to about 100 micrometers. The twisted carbon nanotube wire can be treated with a volatile organic solvent after being twisted to further bundle the adjacent parallel carbon nanotubes together. Surface treating the twisted carbon nanotube wire can decrease the specific surface area of the twisted carbon nanotube wire and increase the density and the strength of the twisted carbon nanotube wire.

The carbon nanotube structure 121 can be a composite by coating the carbon nanotubes of the carbon nanotube structure 121 with a coating layer (not shown). In one embodiment, each of the carbon nanotubes is completely coated by the coating layer. The material of the coating layer can be metal, metal oxide, metal nitride, metal carbide, metal sulfide, silicon oxide, silicon nitride, or silicon carbide. The metal can be gold, nickel, titanium, iron, aluminum, titanium, chromium, or alloy thereof. The metal oxide can be alumina ($Al_2O_3$), magnesium oxide, zinc oxide, or hafnium oxide. The material of the coating layer is not limited above and can be any material as long as the material can be deposited on the carbon nanotube structure 121. The coating layer is combined with the carbon nanotube structure 121 mainly by van der Waals attractive force therebetween. The thickness of the coating layer is not limited and can be in a range of about 3 nanometers to about 50 nanometers. In one embodiment, a gold layer of 10 nanometers thickness is deposited on a single drawn carbon nanotube film by electron beam evaporation.

Similar to a metal material where the electromagnetic wave energy absorption of gold mostly depends on the carrier electrons, the electromagnetic wave energy absorption of the carbon nanotubes also mostly depends on the carrier electrons. However, the carrier electrons density of gold is much greater than the carrier electrons density of the carbon nanotubes. A small amount of gold coated on the drawn carbon nanotube film can affect the transmittance of the drawn carbon nanotube film. Therefore, the transmittance of the drawn carbon nanotube film can be modulated by coating gold layer on the drawn carbon nanotube film.

The vacuum chamber 14A is configured to accommodate the polarizer 12A and prevent the carbon nanotube structure 121 from being burnt during heating. When the carbon nanotube structure 121 is coated by a metallic coating layer, the vacuum chamber 14A can prevent the metallic coating layer from oxidization during heating. The far infrared light source 11A, the polarizer 12A, and the heater 15A can be all located in the vacuum chamber 14A. The material of the vacuum chamber 14A should be transparent for the far infrared light, such as glass or polymer. The pressure of the vacuum chamber 14A can be less than $10^{-2}$ Pa, such as $10^{-4}$ Pa. Alternatively, the vacuum chamber 14A can be filled with inert gas or nitrogen gas. When the carbon nanotube structure 121 is heated to a low temperature, such as lower than 100° C., the vacuum chamber 14A can be omitted.

The heater 15A can be located in the vacuum chamber 14A or outside of the vacuum chamber 14A. When the heater 15A is located outside of the vacuum chamber 14A, the heater 15A can be a laser. When the heater 15A and the carbon nanotube structure 121 are spaced apart from each other, the primary thermal exchange between the heater 15A and the carbon nanotube structure 121 is by thermal radiation. The thermal radiation may introduce other electromagnetic waves in the carbon nanotube structure 121 and adversely affect the modulations of the far infrared light. According to the present disclosure, heating the carbon nanotube structure 121 by introducing electronic current may achieve the targeted far infrared light modulation with a better result.

In one embodiment, the heater 15A includes the carbon nanotube structure 121, a first electrode 151, a second electrode 152, and a power supply 153. The first electrode 151 and the second electrode 152 are spaced apart from each other and each electrically connected to the power supply 153. The first electrode 151 and the second electrode 152 can be metal sheets or metal film. Each of the first electrode 151 and the second electrode 152 are located on the frame 120 and electrically connected to the carbon nanotube structure 121. Part of the carbon nanotube structure 121 is sandwiched between the frame 120 and the first electrode 151 or between the frame 120 and the second electrode 152. The power supply 153 can be an alternating current power supply or a direct current power supply, such as a battery. When a voltage is supplied between the first electrode 151 and the second electrode 152, the carbon nanotube structure 121 may generate heat.

Figure 6:
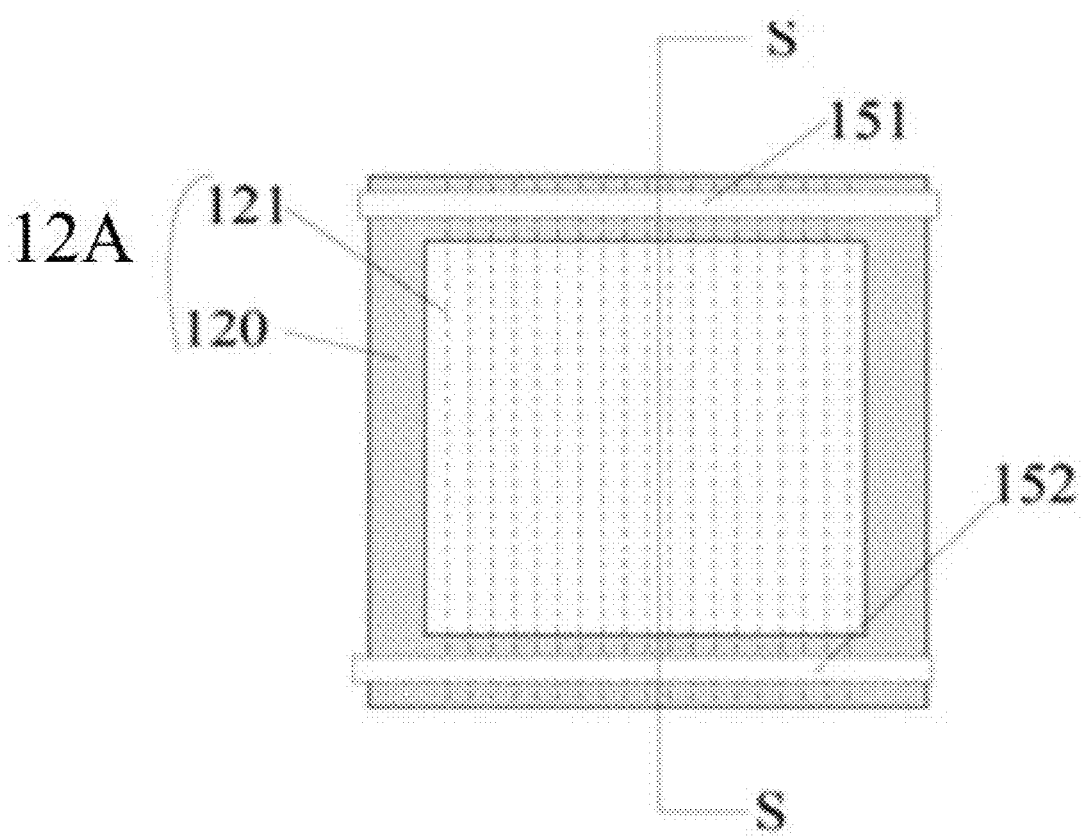
FIG. 6 is a schematic section view of one embodiment of a polarizer and a heater.
Figure 7:
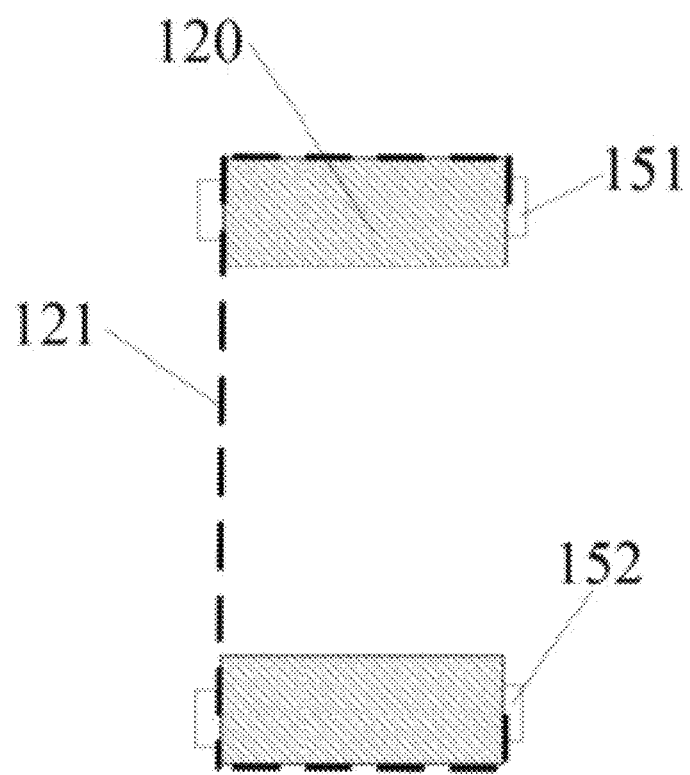
FIG. 7 is a cross-sectional view, along a line S-S of FIG. 6.

Referring to FIGS. 6-7, in one embodiment, the length of the carbon nanotube structure 121 is greater than the length of the frame 120. The carbon nanotube structure 121 is located on a first surface of the frame 120, and the two sides of the carbon nanotube structure 121 are folded and extended over second surfaces of the frame 120, each of the second surfaces being adjacent to the first surface. The first electrode 151 and the second electrode 152 are two metal rings around the frame 120 so that part of the carbon nanotube structure 121 is sandwiched between the frame 120 and the first electrode 151 or between the frame 120 and the second electrode 152. Thus, the carbon nanotube structure 121 is fixed on the frame 120.

Figure 8:
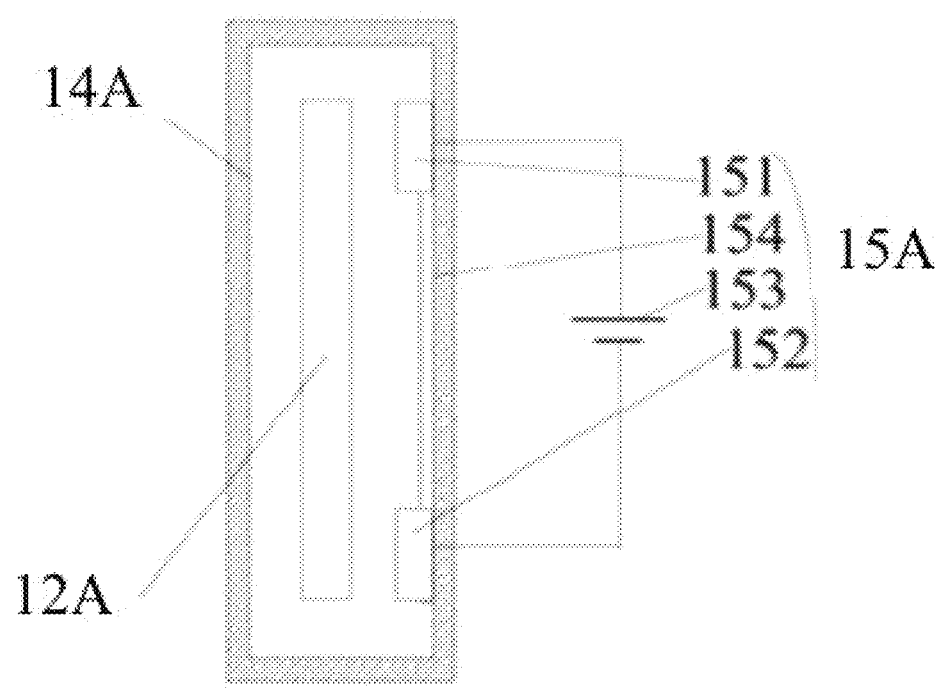
FIG. 8 is a schematic section view of one embodiment of a polarizer and a heater.

Referring to FIG. 8, the heater 15A further include a heating film 154, a first electrode 151, a second electrode 152, and a power supply 153. The heating film 154 is located on an inner surface of the vacuum chamber 14A and spaced apart from the carbon nanotube structure 121. Each of the first electrode 151 and the second electrode 152 are located on the inner surface of the vacuum chamber 14A and electrically connected to the heating film 154. The heating film 154 should be transparent for the far infrared light, such as indium tin oxide (ITO).

A method for generating far infrared polarized light is disclosed. The method includes: allowing far infrared to pass through the carbon nanotube structure 121; and heating the carbon nanotube structure 121. The carbon nanotube structure 121 may be located in a vacuum chamber 14A. The method disclosed herein may generate polarized light of various wavelengths.

Figure 9:
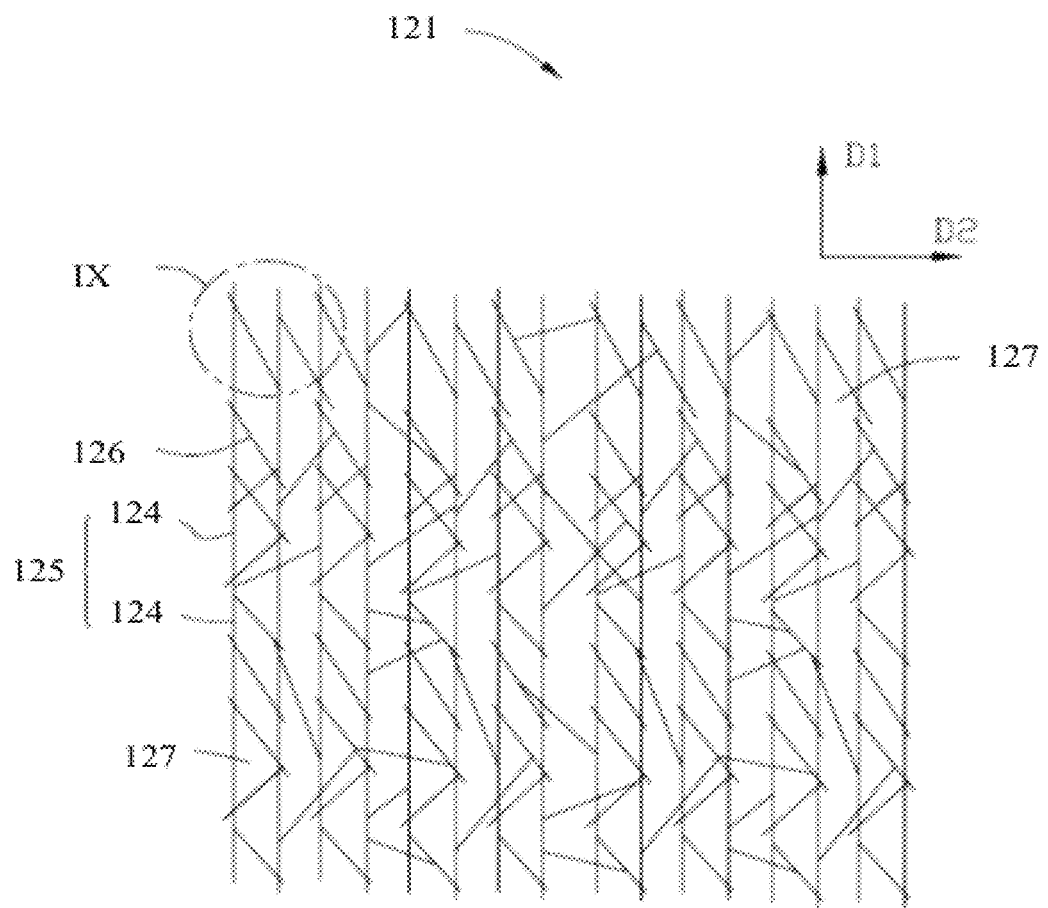
FIG. 9 is a schematic view of the drawn carbon nanotube film.
Figure 10:
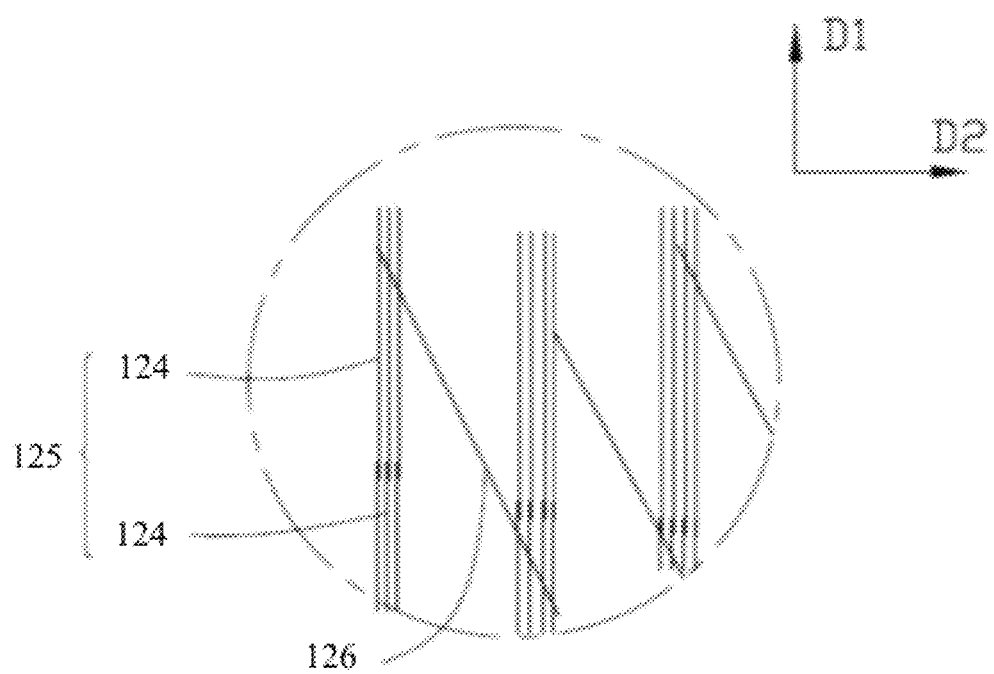
FIG. 10 is a partial enlargement of Circle IX of the drawn carbon nanotube film of FIG. 9.

As shown in FIGS. 9-10, the carbon nanotube structure 121 is a drawn carbon nanotube film and includes a plurality of first carbon nanotubes 124 and a plurality of second carbon nanotubes 126. The plurality of first carbon nanotubes 124 are the majority portion of the carbon nanotubes of the carbon nanotube structure 121. The plurality of second carbon nanotubes 126 are the minority portion of the carbon nanotubes of the carbon nanotube structure 121. The plurality of first carbon nanotubes 124 are arranged to extend substantially along the same direction to form a plurality of carbon nanotube wires 125 in parallel with each other. The plurality of second carbon nanotubes 126 are randomly dispersed between the plurality of carbon nanotube wires 125 and in contact with the plurality of carbon nanotube wires 125. The extending direction of the plurality of first carbon nanotubes 124 is defined as direction D1, and a direction perpendicular to the direction D1 is defined as direction D2. The plurality of first carbon nanotubes 124 of the plurality of carbon nanotube wires 125 are joined end to end by van der Waals force therebetween along direction D1. The plurality of first carbon nanotubes 124 of the plurality of carbon nanotube wires 125 are parallel with each other and joined by van der Waals force therebetween along direction D2 to form a carbon nanotubes segment. A plurality of apertures 127 are formed among the plurality of carbon nanotube wires 125. The plurality of aperture 127 allows the far infrared to pass through and being polarized. However, the plurality of second carbon nanotubes 126, which are disorderly and randomly dispersed, are not beneficial to the polarization modulation.

According to the present disclosure, the carbon nanotube structure 121 can be treated to remove at least some of the plurality of second carbon nanotubes 126 by laser scanning or plasma etching. Thus, the ratio of the plurality of first carbon nanotubes 124 to the plurality of the second carbon nanotubes 126 may be increased and the anisotropy of the carbon nanotube structure 121 improved. After removing the second carbon nanotubes 126, the plurality of carbon nanotube wires 125 should not be broken apart.

In one embodiment, the carbon nanotube structure 121 is irradiated by the laser with a power density greater than $0.1 \times 10^4$ watts per square meter in air. The laser scanning can be performed by fixing the carbon nanotube structure 121 and moving the laser along the direction D1, or fixing the laser and moving the carbon nanotube structure 121 along the direction D1.

In one embodiment, the carbon nanotube structure 121 is etched by applying plasma energy on the entire or part surface of the carbon nanotube structure 121 via a plasma treating device. The plasma gas can be an inert gas and/or etching gases, such as argon (Ar), helium (He), hydrogen ($H_2$), oxygen ($O_2$), fluorocarbon ($CF_4$), ammonia ($NH_3$), or air. The power of the plasma treating device can be in a range from about 50 watts to about 1000 watts, such as 100 watts, 200 watts, 500 watts, 700 watts, or 800 watts. The plasma flow can be in a range from about 5 sccm to about 100 sccm, such as 10 sccm, 20 sccm, 50 sccm, 70 sccm, or 80 sccm. When the plasma is generated in vacuum, the work pressure of the plasma can be in a range from about 40 mTorr to about 150 mTorr, such as 50 mTorr, 60 mTorr, 70 mTorr, 80 mTorr, 100 mTorr, 120 mTorr, or 130 mTorr. When the plasma is generated under a standard atmospheric pressure, the work pressure of the plasma can be about 760 Torr. The time for plasma treating can be in a range from about 30 seconds to about 150 seconds, such as 50 seconds, 60 seconds, 90 seconds, 100 seconds, or 120 seconds. The time for plasma treating should be short to prevent breaking apart of the first carbon nanotubes 124 of the carbon nanotube wires 125. In one embodiment, the time for plasma treating is controlled to just substantially break all the second carbon nanotubes 126.

Figure 11:
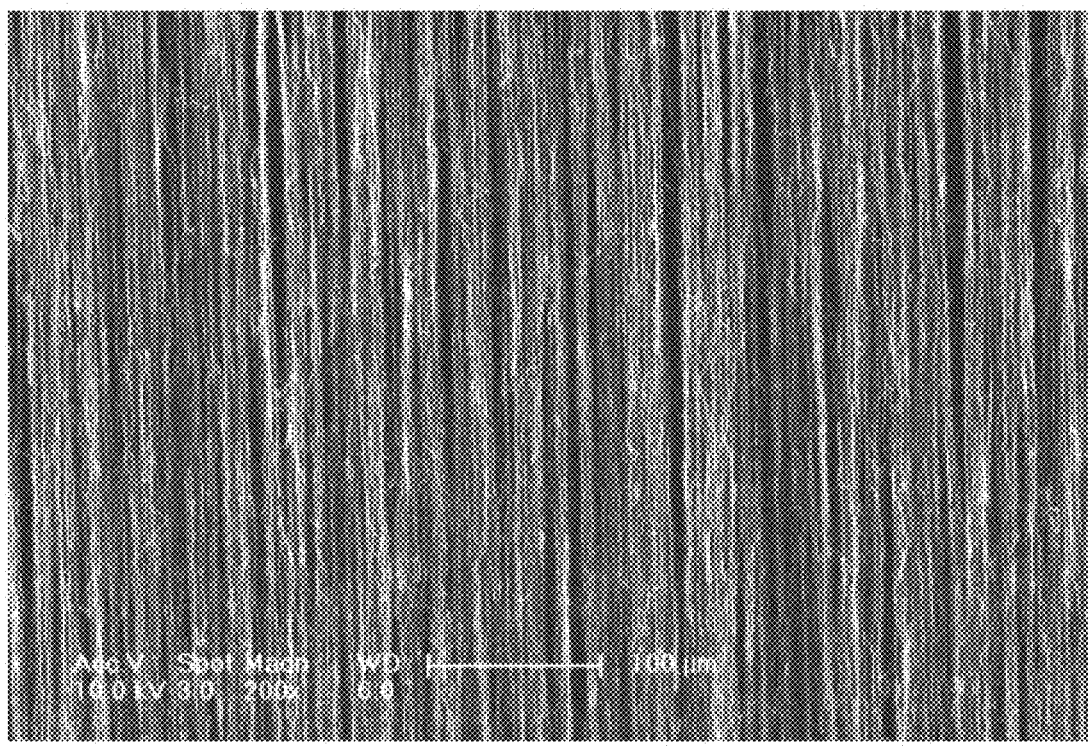
FIG. 11 is a SEM image of a treated drawn carbon nanotube film.

FIG. 11 shows two stacked drawn carbon nanotube films after being treated by the plasma. The treated drawn carbon nanotube films of FIG. 11 have less disordered carbon nanotubes, i.e., the second carbon nanotubes 126, than those of the untreated drawn carbon nanotube film of FIG. 3.

The degree of polarization and transmission of the far infrared light of the carbon nanotube structures 121 of treated two stacked drawn carbon nanotube films of FIG. 11 are tested and disclosed herein.

Figure 12A:
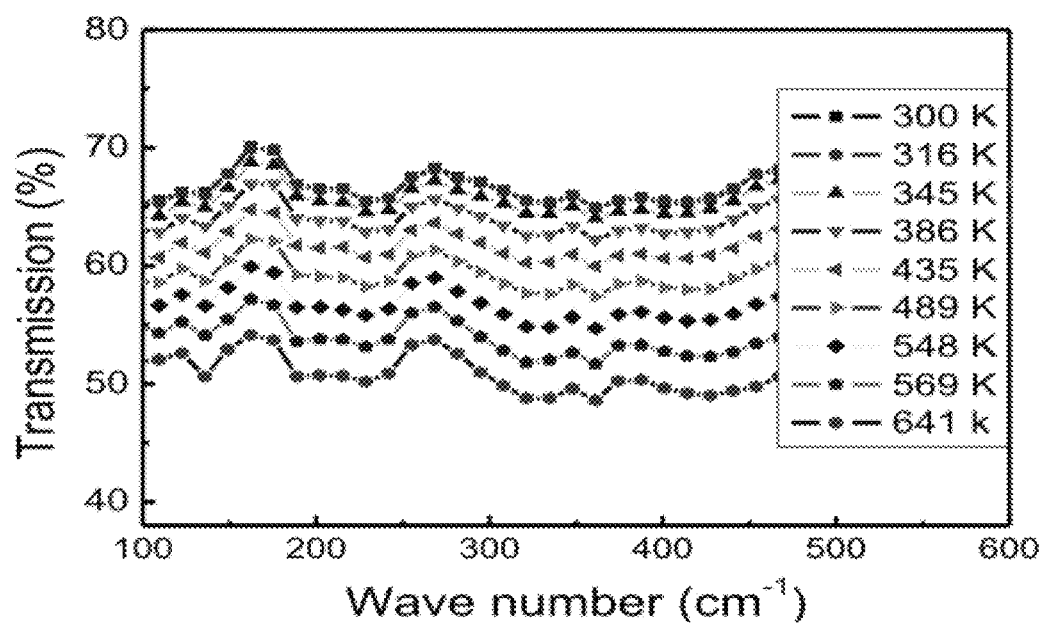
FIG. 12A shows a diagram of transmission vs. wave number of far infrared light of two stacked drawn carbon nanotube films at different temperatures.
Figure 12B:
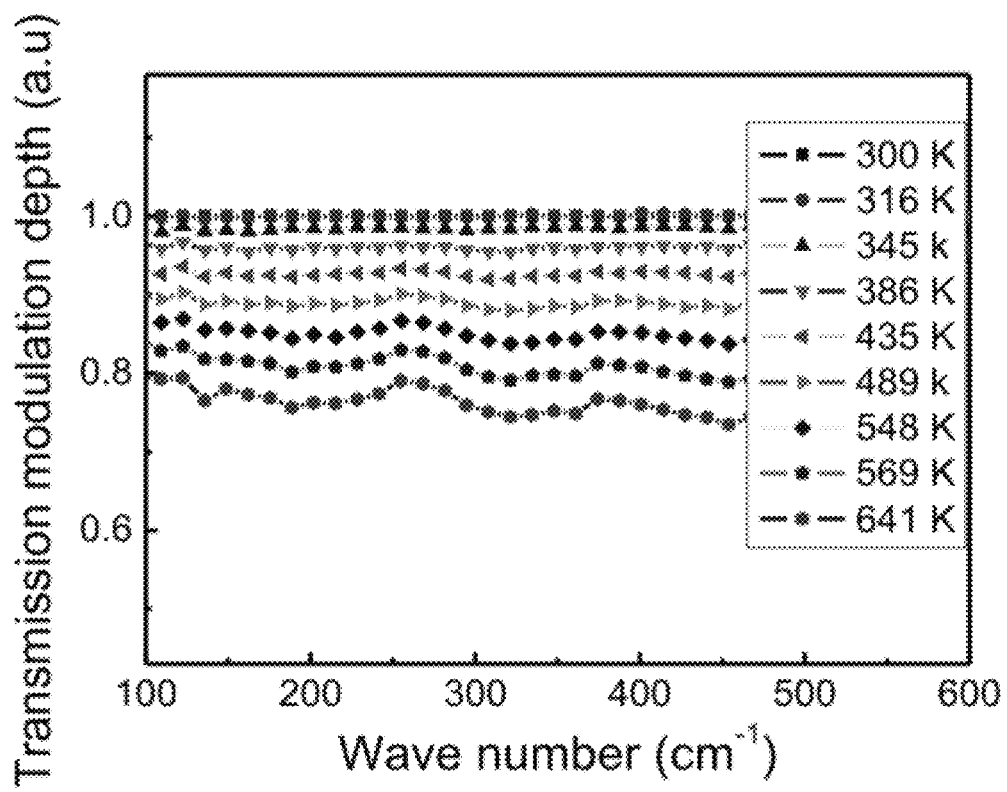
FIG. 12B shows a diagram of transmission modulation depth vs. wave number of far infrared light of two stacked drawn carbon nanotube films at different temperatures.

FIG. 12A shows a diagram of transmission vs. wave number of far infrared light of the carbon nanotube structure 121 at different temperatures. FIG. 12B shows a diagram of transmission modulation depth vs. wave number of far infrared light of two stacked drawn carbon nanotube films at different temperatures. The carbon nanotube structure 121 is respectively heated to 300K, 316K, 345K, 386K, 435K, 489K, 548K, 569K and 641K. The far infrared light has a wave number in a range from 100 $cm^{-1}$ to 600 $cm^{-1}$. As the temperate increases, the transmission decreases, and the transmission modulation depth also decreases. The transmission of the carbon nanotube structure 121 is related to the phonons of the carbon nanotube structure 121. As the temperate increases, the vibrations of phonons in enhanced. Thus, the carbon nanotube structure 121 can absorb more far infrared light, and the transmission of the carbon nanotube structure 121 decreases.

Figure 13:
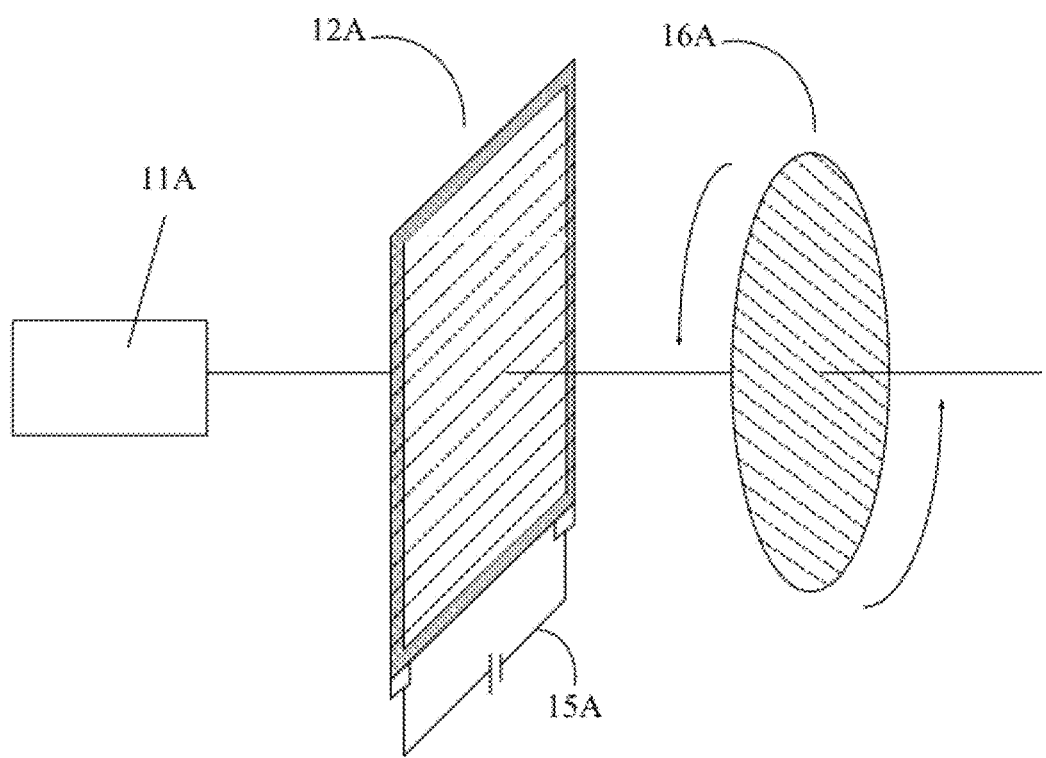
FIG. 13 shows that a far infrared light emitted from a far infrared light source passes through a polarizer and a polarization detector.

Furthermore, in order to test the degree of polarization of the carbon nanotube structure 121, experiments as configured as shown in FIG. 13 were carried out. The far infrared light emitted from the far infrared light source 11A passes through the polarizer 12A and the polarization detector 16A sequentially. The far infrared light source 11A, the polarizer 12A, and the polarization detector 16A are arranged spaced apart from each other and along a straight line. The polarizer 12A and the polarization detector 16A are parallel to each other. The polarizer 12A includes the frame 120 and the carbon nanotube structure 121 located one the frame. The carbon nanotube structure 121 includes two drawn carbon nanotube films stacked with each other and the carbon nanotubes of the two drawn carbon nanotube films are arranged predominately along the horizontal direction. The frame 120 includes two metal sheets placed spaced apart, on two opposite sides of the carbon nanotube structure 121 and extending along the vertical direction perpendicular to the horizontal direction. The metal sheets are electrically connected to the power supply and used as two electrodes. The carbon nanotube structure 121, the frame 120 comprising the two metal sheets, and the power supply form the heater 15A. The power supply is used to supply a voltage between the two metal sheets to heat the carbon nanotube structure 121. The voltage is less than 60V. In one embodiment, the voltage ranges from 0V to 40V. The voltage can be constant or variable. The polarization detector 16A includes ten drawn carbon nanotube films stacked with each other, and all the carbon nanotubes of the ten drawn carbon nanotube films are arranged along the same direction. The polarization detector 16A is rotatable around an axis line defined by the center point of the polarizer 12A and the center point of the polarization detector 16A. The polarization detector 16A can be rotated from 0 degrees to 360 degrees with an interval angle of 10 degrees. When the polarization detector 16A is rotated, the polarizer 12A is static. When the extending direction of the carbon nanotubes of the polarization detector 16A is perpendicular with the extending direction of the carbon nanotubes of the polarizer 12A, the rotation angle is defined as 0 degrees.

Figure 14A:
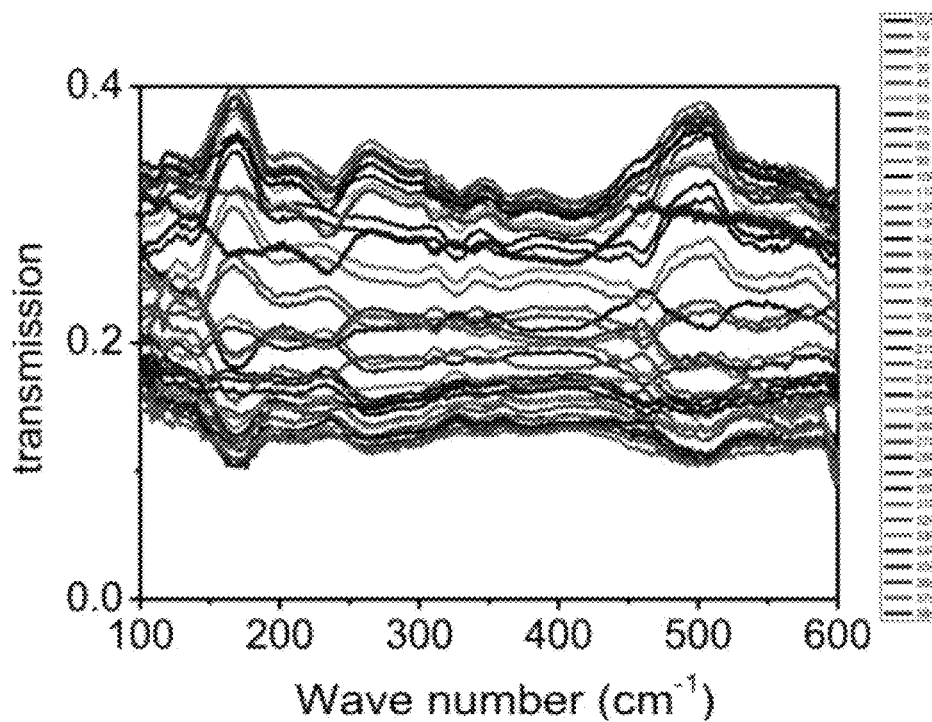
FIG. 14A shows a diagram of test results of transmission vs. wave number of the polarization detector of FIG. 13 for the far infrared polarized light generated by the polarizer of FIG. 13 at a temperature of 300K.
Figure 14B:
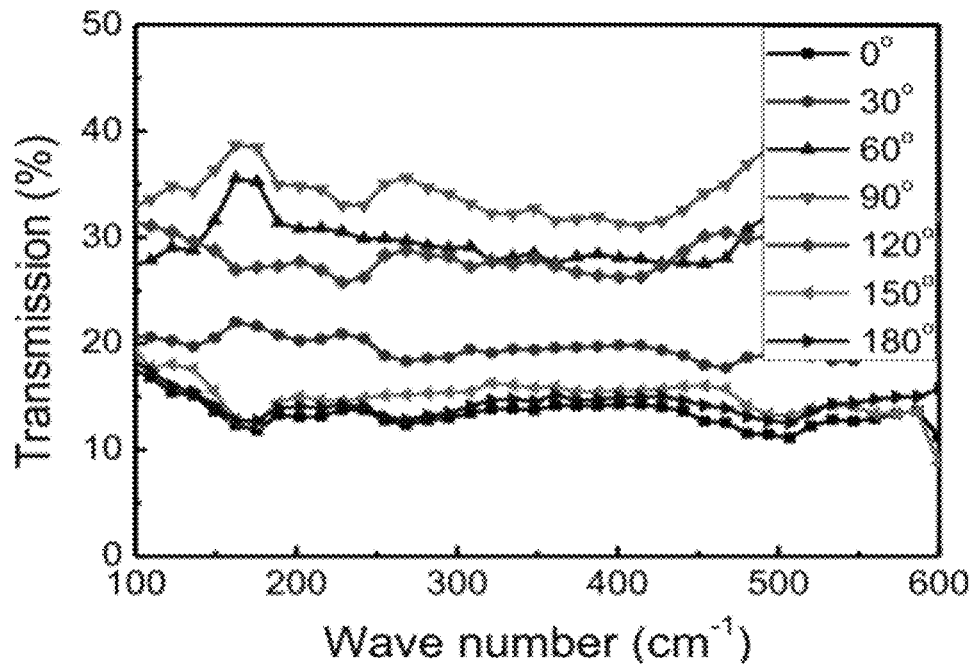
FIG. 14B shows a diagram of partial test results of FIG. 14A, where the polarization detector is rotated from 0 degrees to 180 degrees at 30 degrees intervals.
Figure 14C:
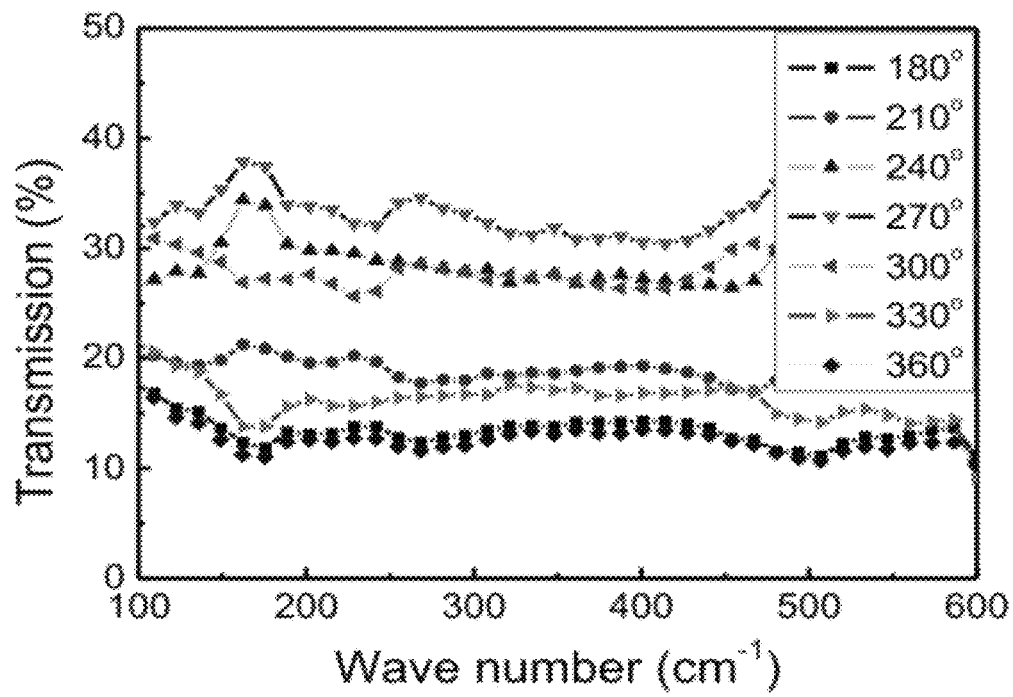
FIG. 14C shows a diagram of another partial test results of FIG. 14A, where the polarization detector is rotated from 180 degrees to 360 degrees at 30 degrees intervals.

FIG. 14A shows a diagram of test results of transmission vs. wave number of the polarization detector 16A for the far infrared polarized light generated by the polarizer 12A at the temperature of 300K. FIG. 14B shows a diagram of partial test results of FIG. 14A, where the polarization detector 16A is rotated from 0 degrees to 180 degrees at 30 degrees intervals. FIG. 14C shows another diagram of partial test results of FIG. 14A, where the polarization detector 16A is rotated from 180 degrees to 360 degrees at 30 degrees intervals.

Figure 15A:
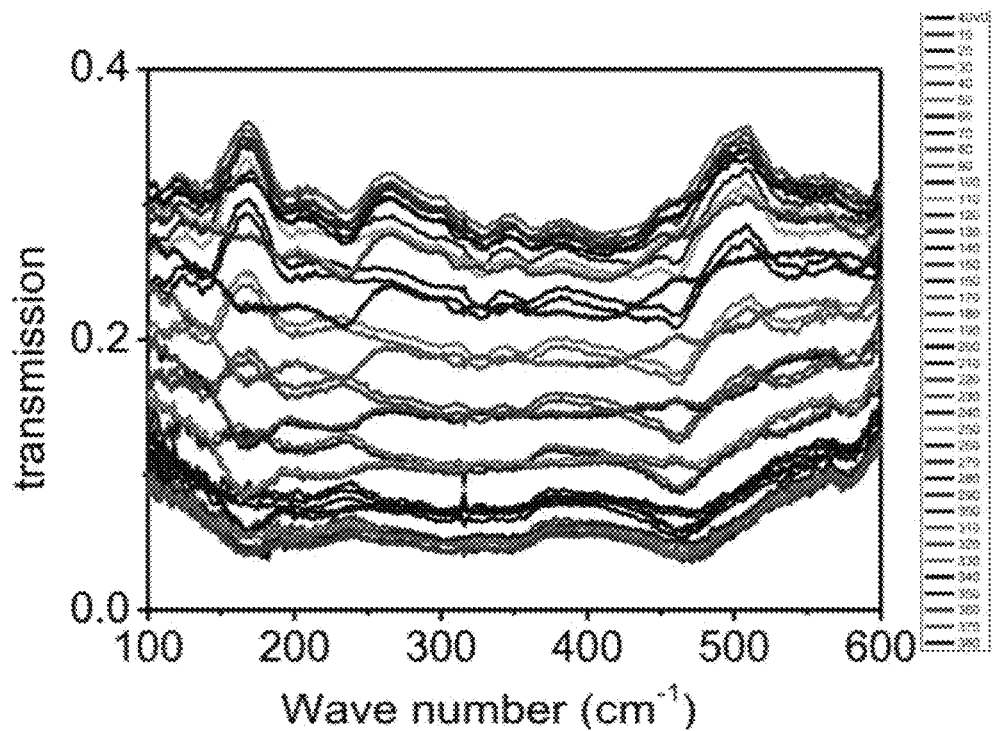
FIG. 15A shows a diagram test results of transmission vs. wave number of the polarization detector of FIG. 13 for the far infrared polarized light generated by the polarizer of FIG. 13 at a temperature of 641K.
Figure 15B:
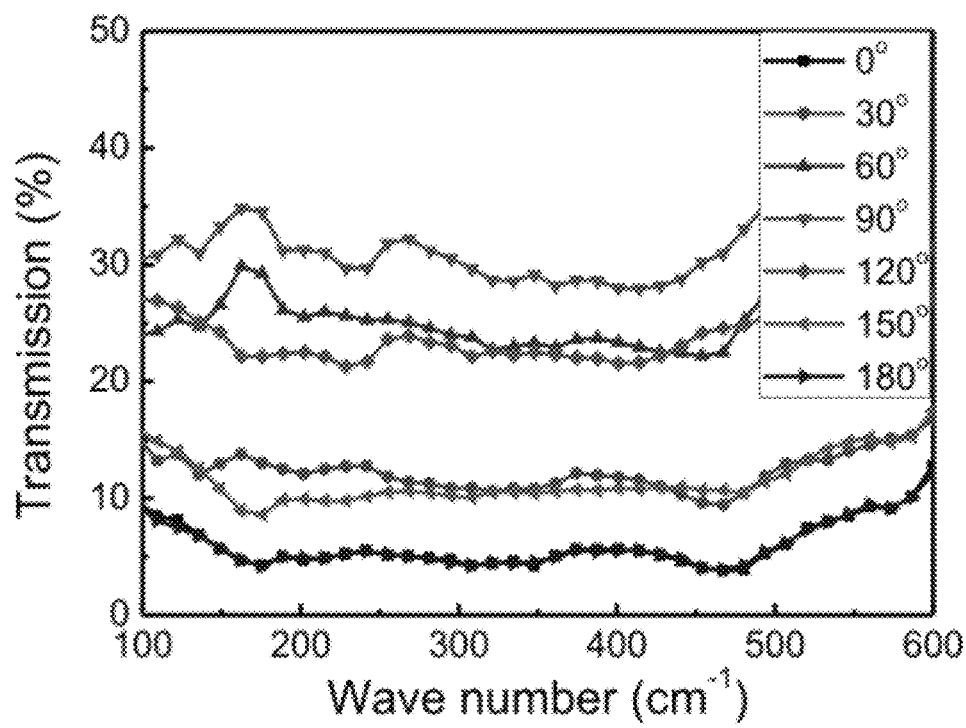
FIG. 15B shows a diagram of partial test results of FIG. 15A, where the polarization detector is rotated from 0 degrees to 180 degrees at 30 degrees intervals.
Figure 15C:
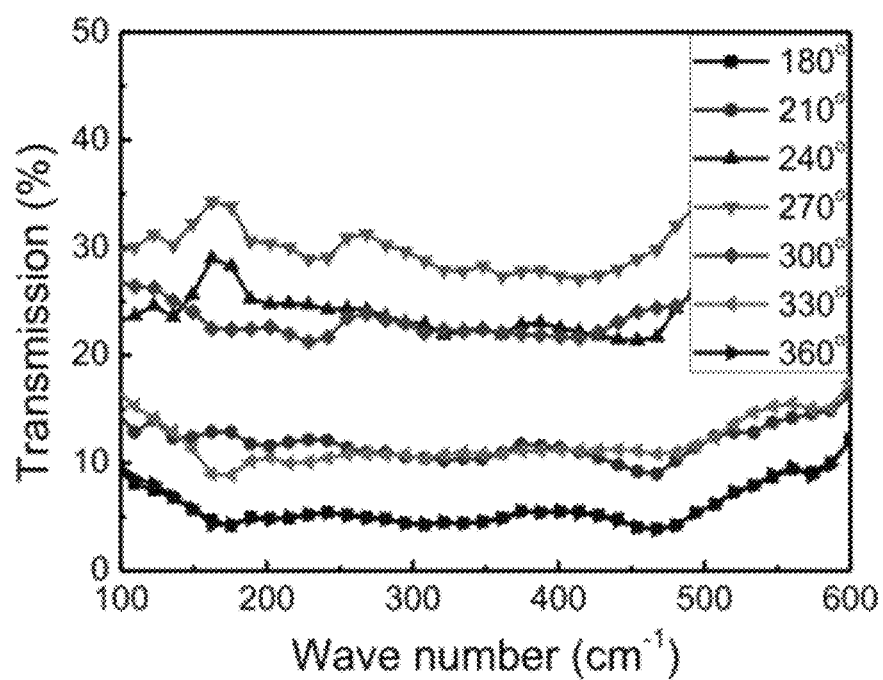
FIG. 15C shows a diagram of another partial test results of FIG. 15A, where the polarization detector is rotated from 180 degrees to 360 degrees at 30 degrees intervals.

FIG. 15A shows a diagram of test results of transmission vs. wave number of the polarization detector 16A for the far infrared polarized light generated by the polarizer 12A at the temperature of 641K. FIG. 15B shows a diagram of partial test results of FIG. 15A, where the polarization detector 16A is rotated from 0 degrees to 180 degrees at 30 degrees intervals. FIG. 15C shows another diagram of partial test results of FIG. 15A, where the polarization detector 16A is rotated from 180 degrees to 360 degrees at 30 degrees intervals.

At the different temperatures of 300K and 641K, the polarization detector 16A has different transmissions for the far infrared polarized light generated by the polarizer 12A. At the same temperature, the transmissions of the polarization detector 16A for the far infrared polarized light are different at different rotation angles. The maximum transmissions of the polarization detector 16A are at the rotation angles of 90 degrees and 270 degrees, at which the extending direction of the carbon nanotubes of the polarization detector 16A is parallel with the extending direction of the carbon nanotubes of the polarizer 12A. The minimum transmissions of the polarization detector 16A are at the rotation angles of 0 degrees and 180 degrees, at which the extending direction of the carbon nanotubes of the polarization detector 16A is perpendicular with the extending direction of the carbon nanotubes of the polarizer 12A.

Figure 16A:
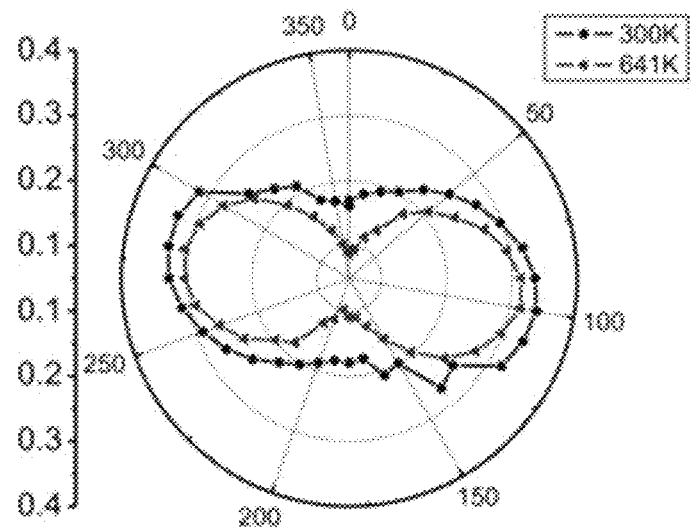
FIG. 16A shows a diagram of tests results of transmission vs. wave number of far infrared light with a wave number of 100 $cm^{-1}$ at temperatures of 300K and 641K by the polarizer and the polarization detector of FIG. 13, where the polarization detector is rotated from 0 degrees to 350 degrees at 50 degrees intervals.
Figure 16B:
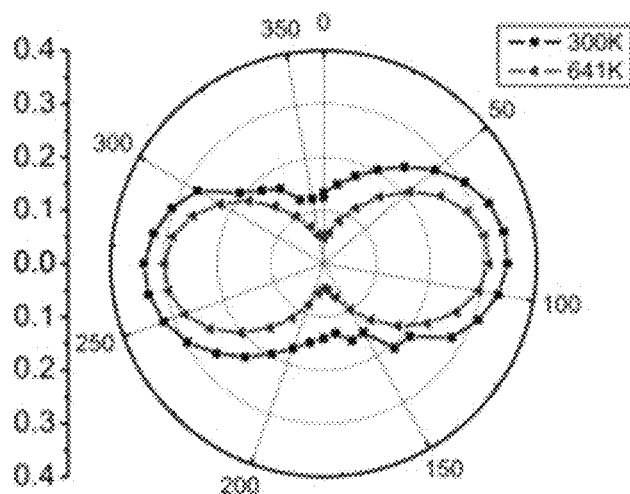
FIG. 16B shows a diagram of test results of transmission vs. wave number of far infrared light with a wave number of 200 $cm^{-1}$ at temperatures of 300K and 641K by the polarizer and the polarization detector of FIG. 13, where the polarization detector is rotated from 0 degrees to 350 degrees at 50 degrees intervals.
Figure 16C:
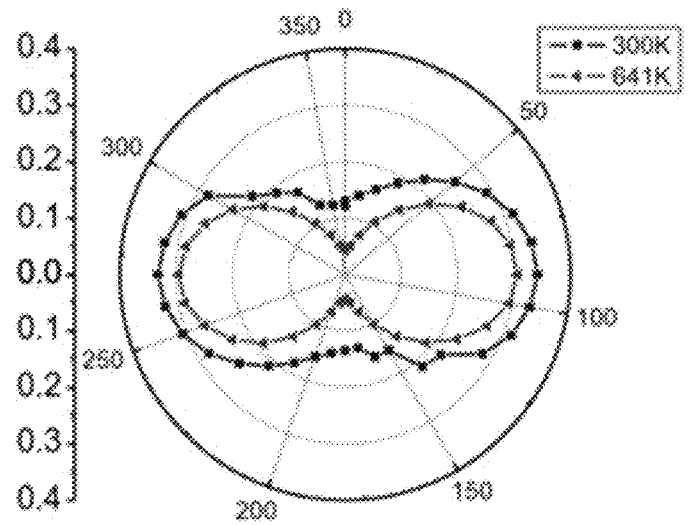
FIG. 16C shows a diagram of test results of transmission vs. wave number of far infrared light with a wave number of 300 $cm^{-1}$ at temperatures of 300K and 641K by the polarizer and the polarization detector of FIG. 13, where the polarization detector is rotated from 0 degrees to 350 degrees at 50 degrees intervals.
Figure 16D:
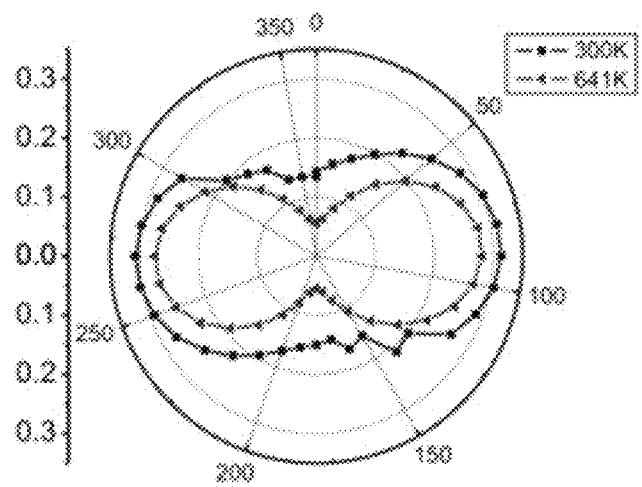
FIG. 16D shows a diagram of test results of transmission vs. wave number of far infrared light with a wave number of 400 $cm^{-1}$ at temperatures of 300K and 641K by the polarizer and the polarization detector of FIG. 13, where the polarization detector is rotated from 0 degrees to 350 degrees at 50 degrees intervals.
Figure 16E:
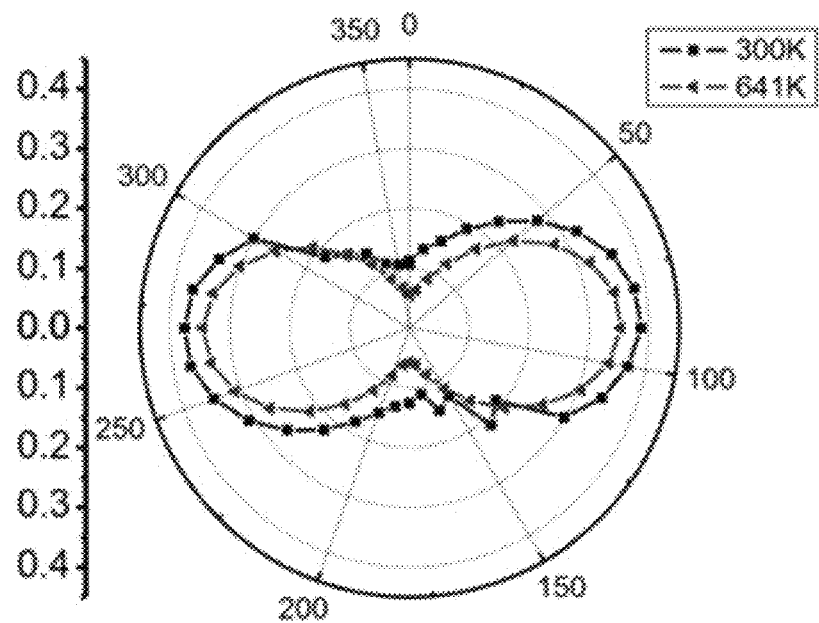
FIG. 16E shows a diagram of test results of transmission vs. wave number of far infrared light with a wave number of 500 cm$^{-1}$ at temperatures of 300K and 641K by the polarizer and the polarization detector of FIG. 13, where the polarization detector is rotated from 0 degrees to 350 degrees at 50 degrees intervals.

FIG. 16A shows a diagram of test results of transmission vs. wave number of far infrared light with a wave number of 100 cm$^{-1}$ at temperatures of 300K and 641K, where the polarization detector is rotated from 0 degrees to 350 degrees at 50 degrees intervals. FIG. 16B shows a diagram of test results of transmission vs. wave number of far infrared light with a wave number of 200 cm$^{-1}$ at temperatures of 300K and 641K, where the polarization detector is rotated from 0 degrees to 350 degrees at 50 degrees intervals. FIG. 16C shows a diagram of test results of transmission vs. wave number of far infrared light with a wave number of 300 cm$^{-1}$ at temperatures of 300K and 641K, where the polarization detector is rotated from 0 degrees to 350 degrees at 50 degrees intervals. FIG. 16D shows a diagram of test results of transmission vs. wave number of far infrared light with a wave number of 400 cm$^{-1}$ at temperatures of 300K and 641K, where the polarization detector is rotated from 0 degrees to 350 degrees at 50 degrees intervals. FIG. 16E shows a diagram of test results of transmission vs. wave number of far infrared light with a wave number of 500 cm$^{-1}$ at temperatures of 300K and 641K, where the polarization detector is rotated from 0 degrees to 350 degrees at 50 degrees intervals. From FIGS. 16A-16E, it can be seen that the maximum transmission and the minimum transmission of the far infrared light with different wave numbers correspond to the same rotation angles respectively.

Figure 17:
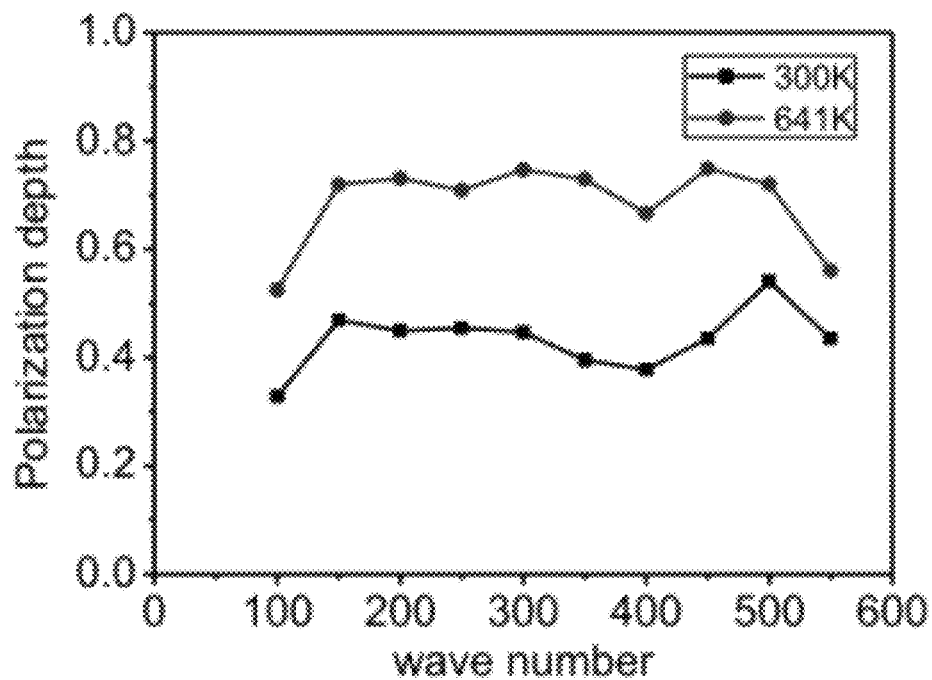
FIG. 17 shows a diagram of test results of polarization depth vs. wave number of far infrared light at temperatures of 300K and 641K by the polarizer and the polarization detector of FIG. 13.

FIG. 17 shows a diagram of test results of polarization depth vs. wave number of far infrared light at temperatures of 300K and 641K. The degree of polarization is calculated according to the formula:

$$DOP = \frac{T_{max} - T_{min}}{T_{max} + T_{min}}$$

Where $T_{max}$ represents the maximum transmission of the far infrared polarized light generated by the polarizer 12A, and $T_{min}$ represents the minimum transmission of the far infrared polarized light generated by the polarizer 12A.

The degrees of polarization of 2-layer stacked drawn carbon nanotube films are 40% at 300K, and 70% at 641K.

Figure 18:
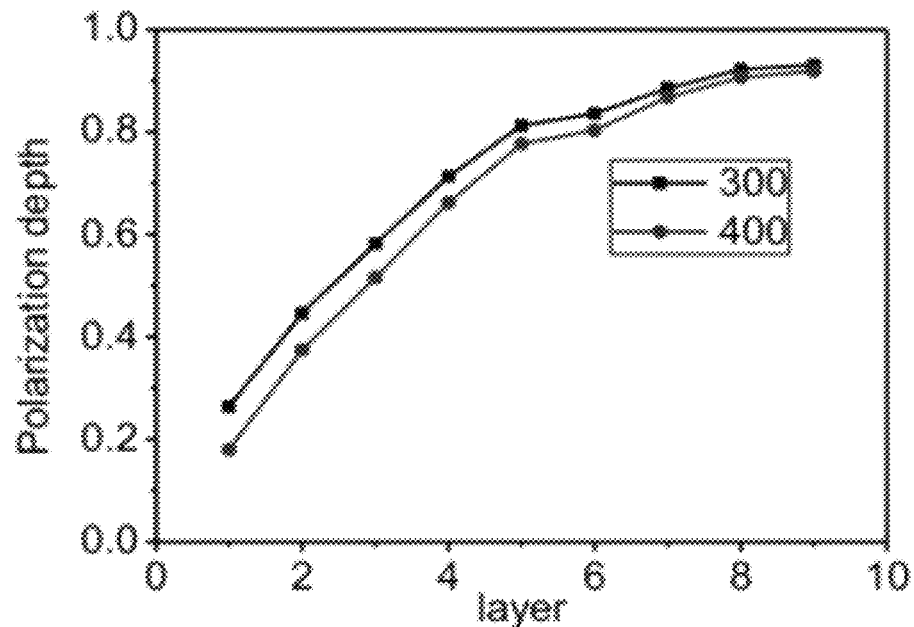
FIG. 18 shows a diagram of test results of polarization depth vs. layer number of far infrared light with wave numbers of 300 cm$^{-1}$ and 400 cm$^{-1}$ by the polarizer and the polarization detector of FIG. 13, wherein the polarizer comprises stacked drawn carbon nanotube films with different layer numbers.
Figure 19:
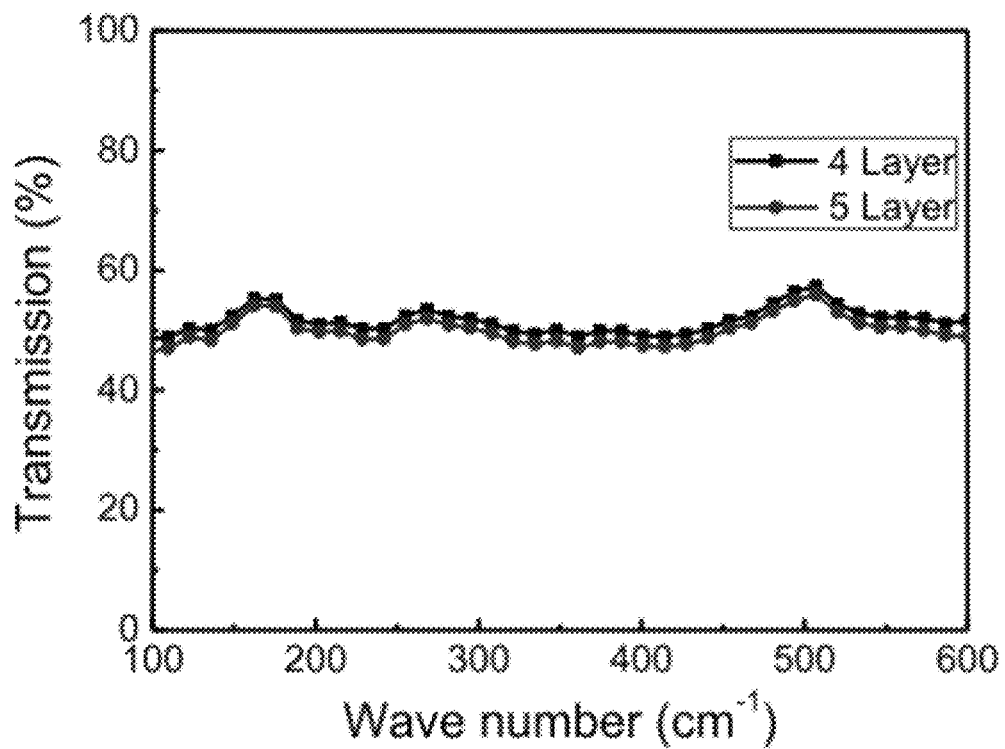
FIG. 19 shows a diagram of test results of transmission vs. wave number of far infrared light with different wave numbers by the polarizer and the polarization detector of FIG. 13, wherein the polarizer comprises 4 or 5 stacked drawn carbon nanotube films.

FIG. 18 shows a diagram of test results of polarization depth vs. layer number of far infrared light with wave number of 300 cm$^{-1}$ and 400 cm$^{-1}$, wherein the layer number of the drawn carbon nanotube films stacked on each other ranges from 1 to 10. The degree of polarization increases as the layer number of the drawn carbon nanotube is increased. When the layer number of the drawn carbon nanotube films stacked on each other is 5, the degree of polarization is 70% at 300K. FIG. 19 shows a diagram of test results of transmission vs. wave number of far infrared light with different wave numbers of 4 and 5 layers of the drawn carbon nanotube films stacked on each other, respectively. the test result shows that the transmission of the 5 layers of drawn carbon nanotube films stacked on each other is 4.6 at 300K. From FIG. 12B, the test result shows that the transmission of the 2 layers of the drawn carbon nanotube films is 5.3 at 641K.

Therefore, the degree of polarization of 2-layer stacked drawn carbon nanotube films at 641K is substantially the same as the degree of polarization of 5-layer stacked drawn carbon nanotube films at 300K. However, the transmission of 2-layer stacked drawn carbon nanotube films at 641K is greater than the transmission of 5-layer stacked drawn carbon nanotube films at 300K. Thus, both heating and increasing layer number can increase the degree of polarization of the stacked drawn carbon nanotube films, and both the heating and increasing layer number can decrease the transmission of the stacked drawn carbon nanotube films. However, on the condition of obtaining the same degree of polarization increase, the heating cause less transmission decrease than increasing layer number does.

Figure 20:
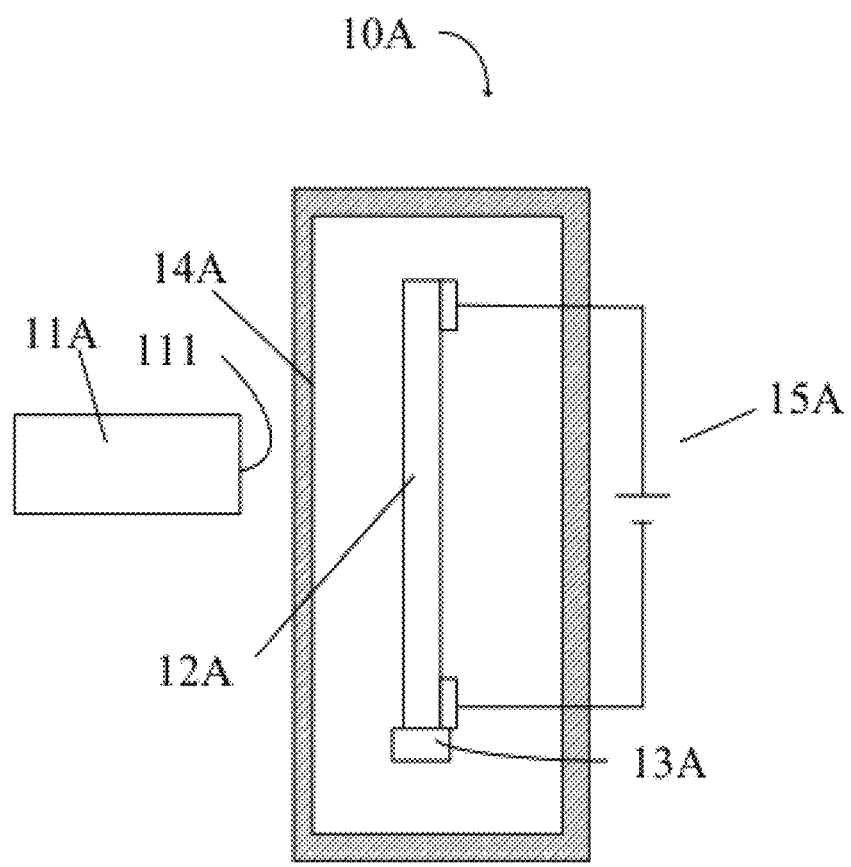
FIG. 20 is a schematic section view of one embodiment of a far infrared polarized light generator.
Figure 21:
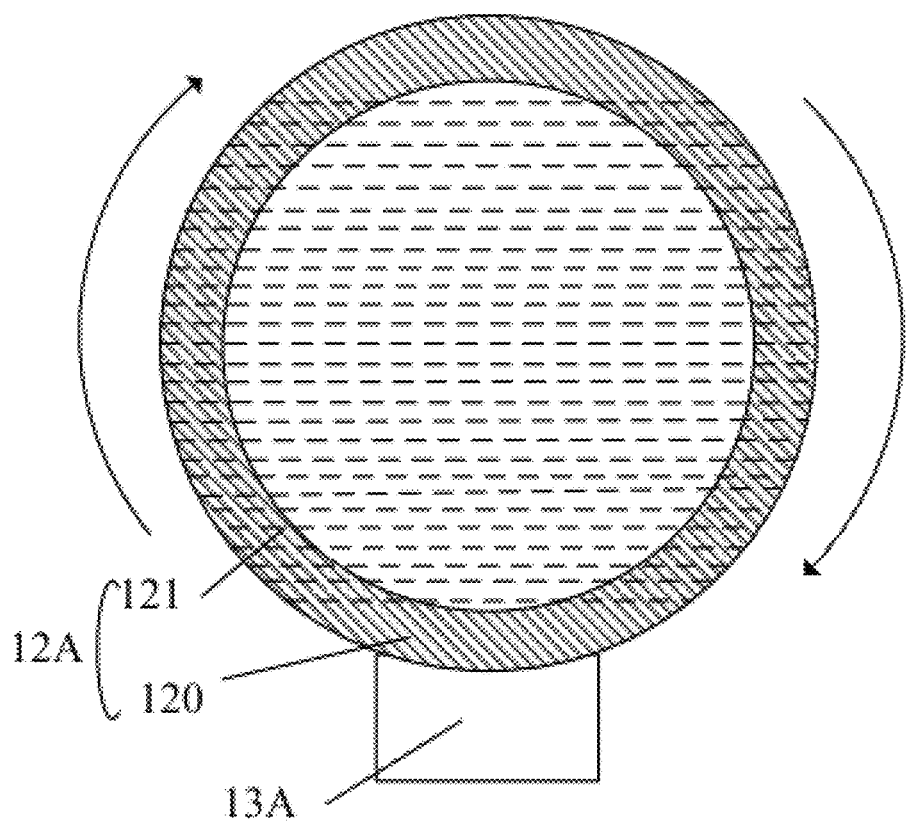
FIG. 21 is a schematic section view of one embodiment of a polarizer and a rotator.

Referring to FIGS. 20-21, a far infrared polarized light generator 10A of one embodiment is disclosed. The far infrared polarized light generator 10A includes a far infrared light source 11A, a polarizer 12A located on the side of the light emitting surface 111 of the far infrared light source 11A, a rotator 13A, a vacuum chamber 14A, and a heater 15A. The far infrared light source 11A is adapted to emit far infrared light. The far infrared light emitted from the far infrared light source 11A passes through the polarizer 12A to form a far infrared polarized light. The heater 15A is adapted to heat the polarizer 12A. The rotator 13A is adapted to rotate the polarizer 12A.

The far infrared polarized light generator 10A is similar to the far infrared polarized light generator 10 disclosed above, except that the far infrared polarized light generator 10A further includes the rotator 13A. The rotator 13A is connected to the polarizer 12A and adapted to adjust the far infrared polarized light by rotating the polarizer 12A.

In one embodiment, the polarizer 12A is round and includes a circular frame and a circular carbon nanotube film as shown in FIG. 21. The rotator 13A can be connected to the circular frame and includes at least a motor and a control computer. The rotating increment of the rotator 13A can be 5 degrees. In one embodiment, the rotating increment of the rotator 13A is 1 degree.

When the lengthwise direction of the carbon nanotubes of the carbon nanotube structure 121 is perpendicular to the horizontal direction, the rotation angle of the rotator 13A is defined as 0 degrees. The polarization direction of the infrared polarized light can be changed by changing the rotation angle of the rotator 13A.

A method for generating far infrared polarized light is disclosed. The method includes: allowing far infrared light to pass through the carbon nanotube structure 121; and heating and rotating the carbon nanotube structure 121 simultaneously. The carbon nanotube structure 121 can be located in a vacuum chamber 14A.

Figure 22:
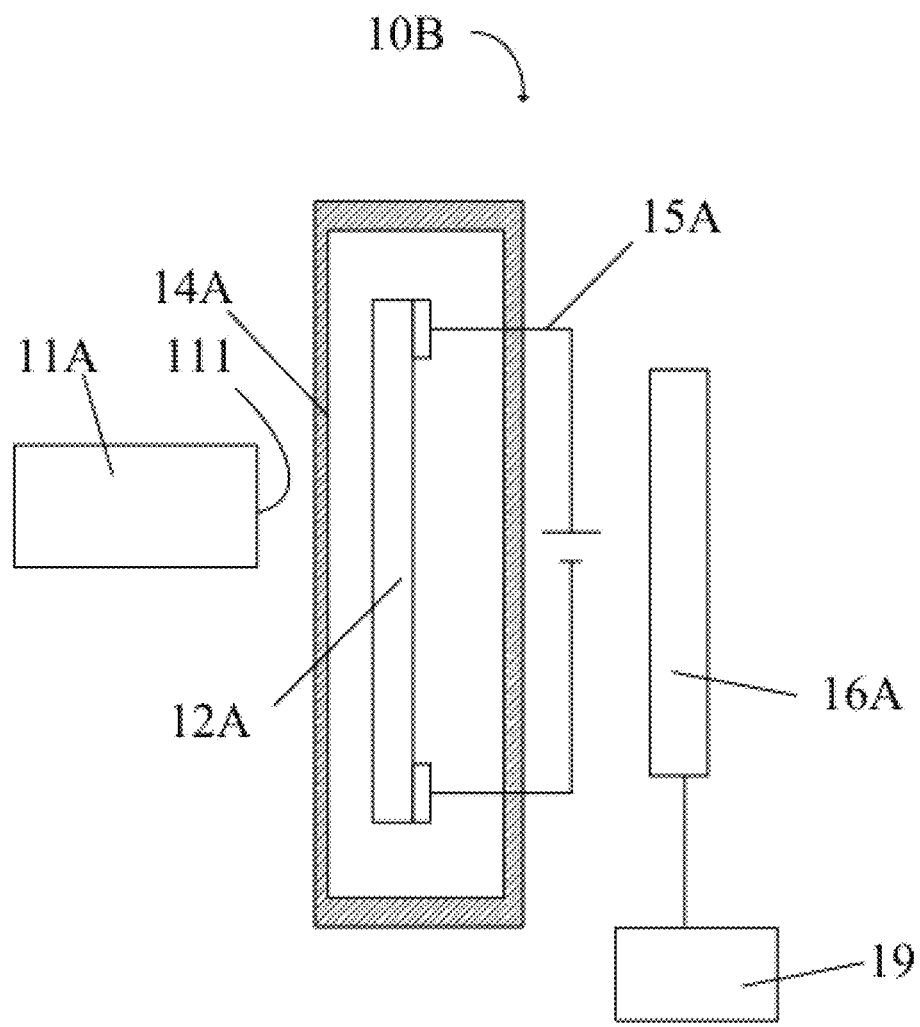
FIG. 22 is a schematic section view of one embodiment of a far infrared polarized light generator.

Referring to FIG. 22, a far infrared polarized light generator 10B of one embodiment is provided. The far infrared polarized light generator 10B includes a far infrared light source 11A, a polarizer 12A located on the side of the light emitting surface 111 of the far infrared light source 11A, a vacuum chamber 14A, a heater 15A, a polarization detector 16A, and a first computer 19. The far infrared light source 11A is adapted to emit far infrared light. The far infrared light emitted from the far infrared light source 11A passes through the polarizer 12A to form a far infrared polarized light. The heater 15A is adapted to heat the polarizer 12A. The polarizer 12A is located in the vacuum chamber 14A. The polarization detector 16A is located on the other side of the polarizer 12A to receive the far infrared polarized light emitted by the polarizer 12A. The polarization detector 16A is electrically connected to the first computer 19.

The far infrared polarized light generator 10B is similar to the far infrared polarized light generator 10 disclosed above, except that the far infrared polarized light generator 10B further includes the polarization detector 16A and the first computer 19. The polarization detector 16A is configured to detect the transmission of the far infrared polarized light generated by the polarizer 12A at different rotation angles. The first computer 19 is adapted to calculate the degree of polarization according to the maximum transmission and the minimum transmission of the far infrared polarized light.

Figure 23:
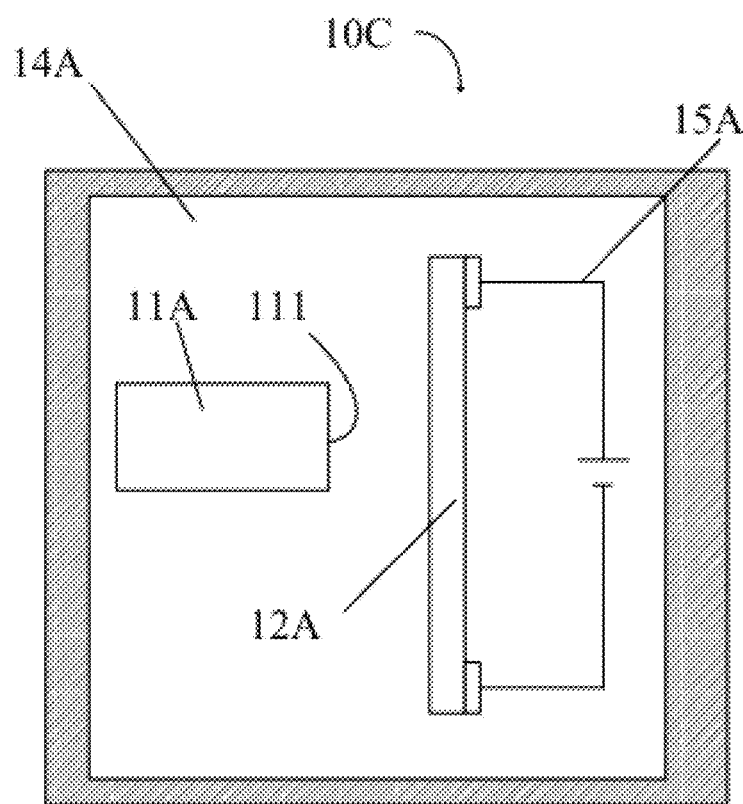
FIG. 23 is a schematic section view of one embodiment of a far infrared polarized light generator.

Referring to FIG. 23, a far infrared polarized light generator 10C of one embodiment is disclosed. The far infrared polarized light generator 10B includes a far infrared light source 11A, a polarizer 12A located on the side of the light emitting surface 111 of the far infrared light source 11A, a vacuum chamber 14A, and a heater 15A. The far infrared light source 11A is adapted to emit far infrared light. The far infrared light emitted from the far infrared light source 11A passes through the polarizer 12A to form a far infrared polarized light. The heater 15A is adapted to heat the polarizer 12A. Both the far infrared light source 11A and the polarizer 12A are located in the vacuum chamber 14A.

The far infrared polarized light generator 10C is similar to the far infrared polarized light generator 10 disclosed above, except that all the far infrared light source 11A, the polarizer 12A, and the heater 15A are located in the vacuum chamber 14A.

Figure 24:
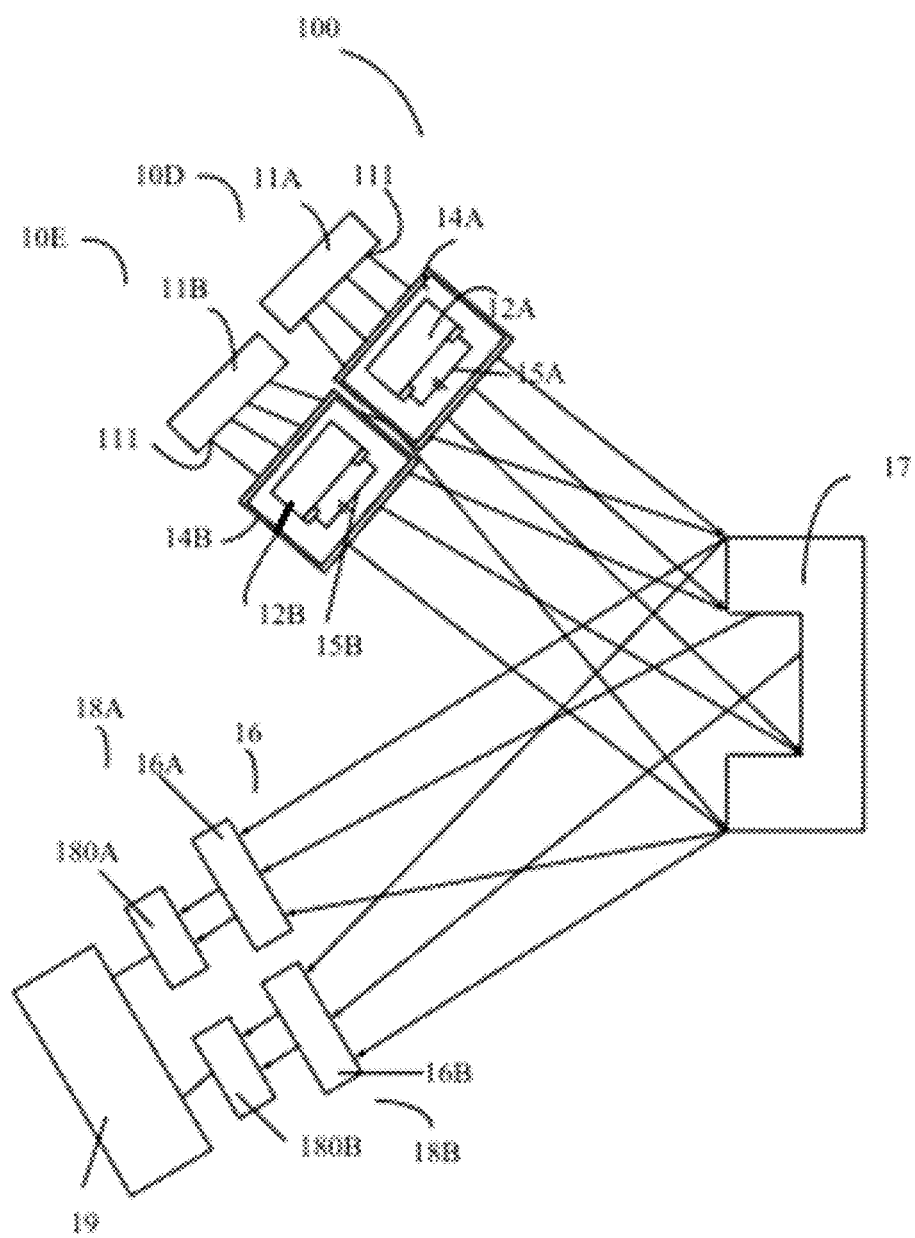
FIG. 24 is a schematic section view of one embodiment of a far infrared imaging system.

Referring to FIG. 24, a far infrared imaging system 100 of one embodiment is disclosed. The far infrared imaging system 100 includes a first far infrared polarized light generator 10D, a second far infrared polarized light generator 10E, a first receiving device 18A, a second receiving device 18B, and a second computer 19.

The first far infrared polarized light generator 10D includes a first far infrared light source 11A, a first polarizer 12A located on the side of the light emitting surface 111 of the first far infrared light source 11A, a first vacuum chamber 14A, and a first heater 15A.

The second far infrared polarized light generator 10E includes a second far infrared light source 11B, a second polarizer 12B located on the side of the light emitting surface 111 of the second far infrared light source 11B, a second vacuum chamber 14B, and a second heater 15B. The polarization direction of the second polarizer 12B is perpendicular to the polarization direction of the first polarizer 12A.

The first receiving device 18A includes a first polarization detector 16A and a first receiver 180A having a light incident surface. The polarization direction of the first polarization detector 16A is parallel to the polarization direction of the first polarizer 12A. The first polarization detector 16A is located on the light incident surface of the first receiver 180A.

The second receiving device 18B includes a second polarization detector 16B and a second receiver 180B having a light incident surface. The polarization direction of the second polarization detector 16B is parallel to the polarization direction of the second polarizer 12B. The second polarization detector 16B is located on the light incident surface of the second receiver 180B.

The second computer 19 is electrically connected to each of the first receiver 180A and the second receiver 180B by wire or wireless. The second computer 19 is adapted to process the information received by the first receiver 180A and the second receiver 180B.

Figure 25:
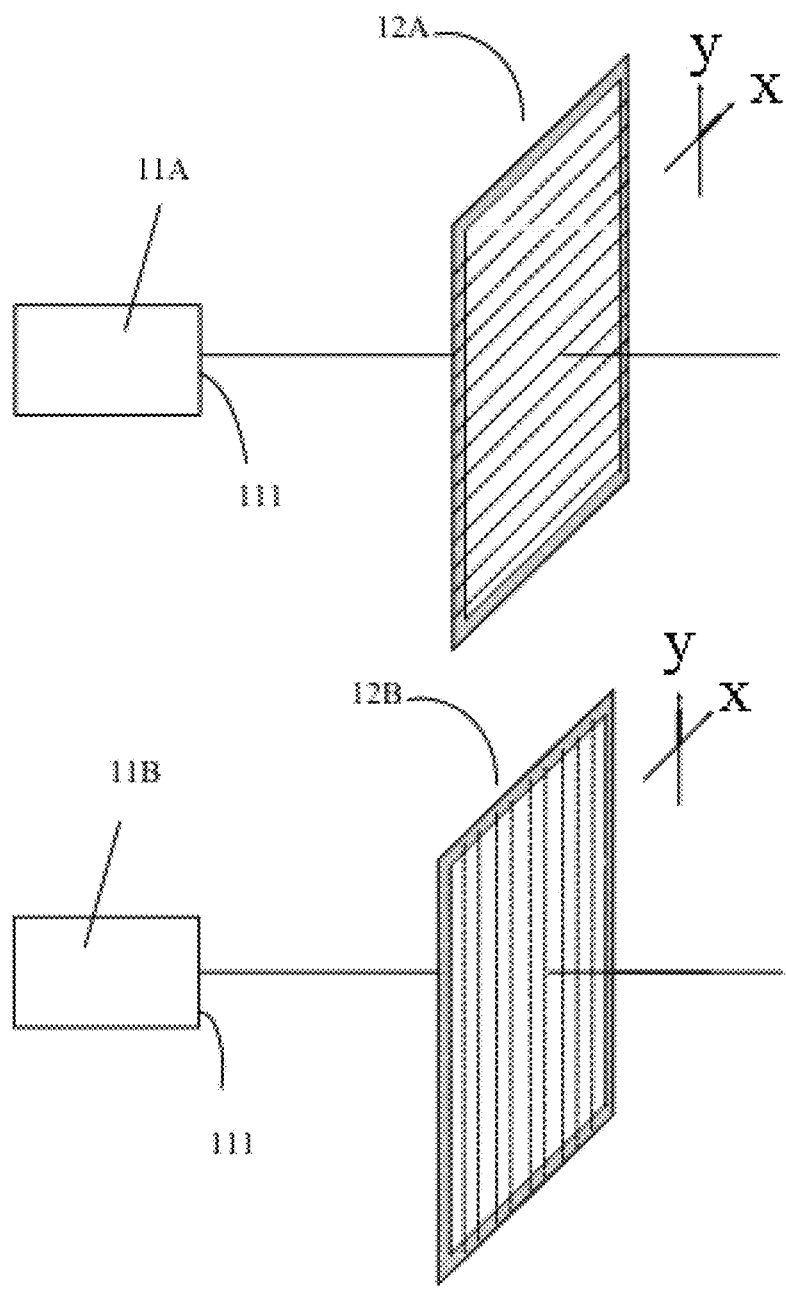
FIG. 25 shows a polarization direction of a first polarizer and a polarization direction of a second polarizer.

In operation, the first far infrared light source 11A emits a first far infrared light, and the second far infrared light source 11B emits a second far infrared light. The first far infrared light passes through the first polarizer 12A to form a first far infrared polarized light, and the second far infrared light passes through the second polarizer 12B to form a second far infrared polarized light. As shown in FIG. 25, the polarization direction of the first polarizer 12A is x direction, and the polarization direction of the second polarizer 12B is y direction perpendicular to the x direction. The extending direction of the carbon nanotubes of the first polarizer 12A is x direction, and the extending direction of the carbon nanotubes of the second polarizer 12B is y direction. The first far infrared polarized light is reflected by the object 17 and forms a first far infrared reflected polarized light, and the second far infrared polarized light is reflected by the object 17 and forms a second far infrared reflected polarized light. The first receiver 180A receives the first far infrared reflected polarized light and obtains the depth information of the object 17. The second receiver 180B receives the second far infrared reflected polarized light and obtains the contour information of the object 17. The first polarization detector 16A is configured to filter light with polarization directions different from the polarization direction of the first far infrared reflected polarized light, so that the first receiver 180A can only receive the first far infrared reflected polarized light. The second polarization detector 16B is configured to filter light with polarization directions different from the polarization direction of the second far infrared reflected polarized light, so that the second receiver 180B can only receive the second far infrared reflected polarized light.

In one embodiment, the first polarization detector 16A is a first drawn carbon nanotube film, and the second polarization detector 16B is a second drawn carbon nanotube film. Both the first polarization detector 16A and the second polarization detector 16B are heated to improve the degrees of polarization of the first far infrared reflected polarized light and the second far infrared reflected polarized light.

The second computer 19 can obtain the depth information of the object 17 by processing the first far infrared reflected polarized light, obtain the contour information of the object 17 by processing the second far infrared reflected polarized light, and obtain a three dimensional image of the object 17 by combining the depth information and the contour information.

Figure 26:
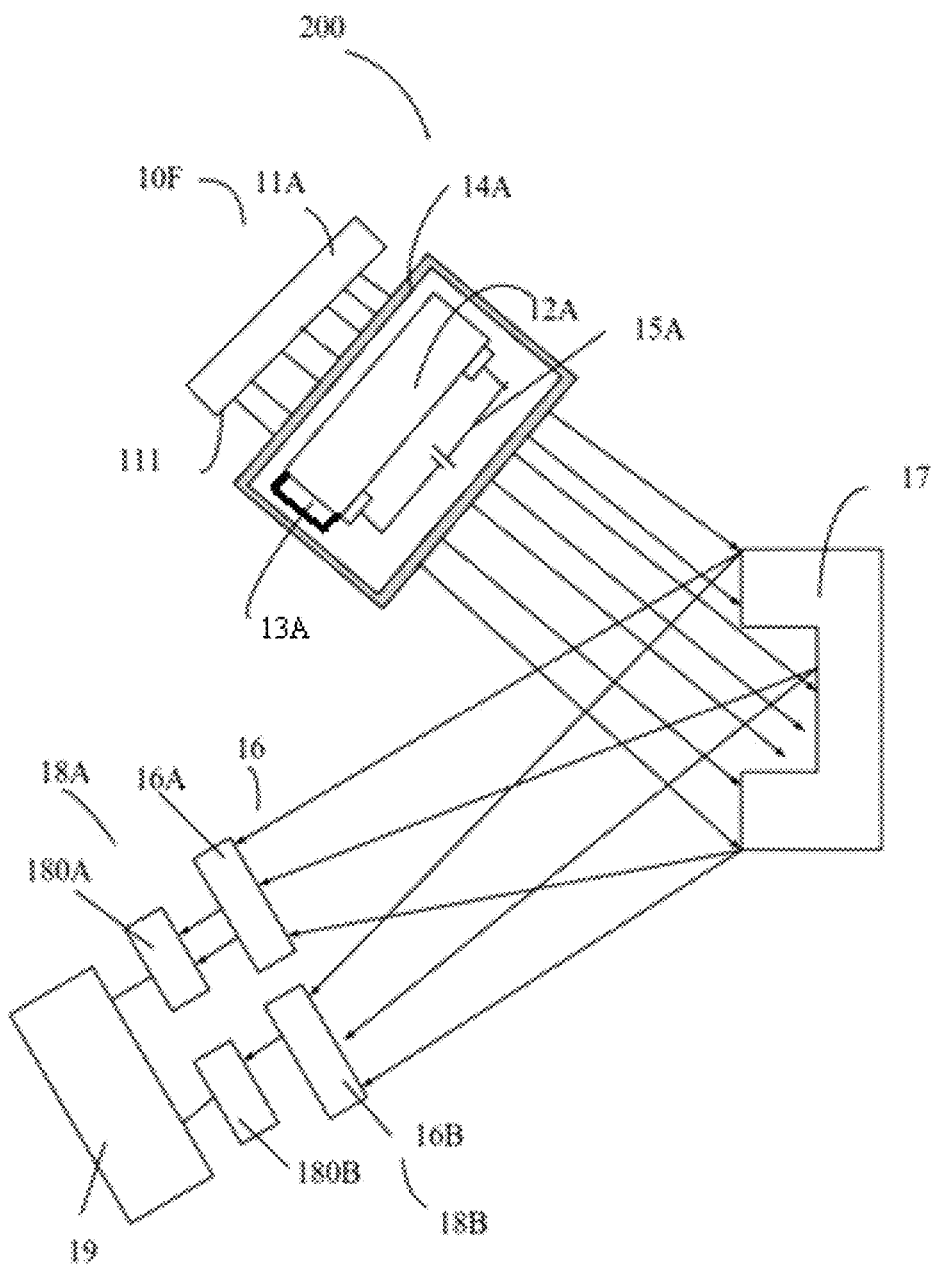
FIG. 26 is a schematic section view of one embodiment of a far infrared imaging system.

Referring to FIG. 26, a far infrared imaging system 200 of one embodiment is disclosed. The far infrared imaging system 200 includes a far infrared polarized light generator 10F, a first receiving device 18A, a second receiving device 18B, and a second computer 19.

The far infrared polarized light generator 10F includes a far infrared light source 11A, a polarizer 12A located on the side of the light emitting surface 111 of the far infrared light source 11A, a rotator 13A, a vacuum chamber 14A, and a heater 15A. The rotator 13A is connected to the polarizer 12A and configured to change the polarization direction of the polarizer 12A, so that the polarizer 12A can have a first polarization direction and a second polarization direction perpendicular to the first polarization direction. When the polarizer 12A has the first polarization direction, the far infrared light passes through the polarizer 12A to form a first far infrared polarized light. When the polarizer 12A has the second polarization direction, the far infrared light passes through the polarizer 12A to form a second far infrared polarized light.

The first receiving device 18A includes a first polarization detector 16A and a first receiver 180A having a light incident surface. The polarization direction of the first polarization detector 16A is parallel to the first polarization direction of the polarizer 12A. The first polarization detector 16A is located on the light incident surface of the first receiver 180A.

The second receiving device 18B includes a second polarization detector 16B and a second receiver 180B having a light incident surface. The polarization direction of the second polarization detector 16B is parallel to the second polarization direction of the polarizer 12A. The second polarization detector 16B is located on the light incident surface of the second receiver 180B.

The second computer 19 is electrically connected to each of the first receiver 180A and the second receiver 180B by wire or wireless. The second computer 19 is configured to process the information received by the first receiver 180A and the second receiver 180B.

In operation, the polarizer 12A is first rotated to have the first polarization direction. The far infrared light source 11A emits a first far infrared light, and the first far infrared light passes through the polarizer 12A to form the first far infrared polarized light. The first far infrared polarized light is reflected by the object 17 to form a first far infrared reflected polarized light. The first receiver 180A receives the first far infrared reflected polarized light and obtains the depth information of the object 17. The first polarization detector 16A is configured to filter other light with polarization directions different from the polarization direction of the first far infrared reflected polarized light, so that the first receiver 180A can only receive the first far infrared reflected polarized light.

Then, the polarizer 12A is rotated 90 degrees by the rotator 13A to have the second polarization direction. The second far infrared light source 11B emits a second far infrared light. The second far infrared light passes through the polarizer 12A to form a second far infrared polarized light. The second far infrared polarized light is reflected by the object 17 to form a second far infrared reflected polarized light. The second receiver 180B receives the second far infrared reflected polarized light and obtains the contour information of the object 17. The second polarization detector 16B is configured to filter other light with polarization directions different from the polarization direction of the second far infrared reflected polarized light, so that the second receiver 180B can only receive the second far infrared reflected polarized light.

In one embodiment, the first polarization detector 16A is a first drawn carbon nanotube film, and the second polarization detector 16B is a second drawn carbon nanotube film. Both the first polarization detector 16A and the second polarization detector 16B are heated to improve the degrees of polarization of the first far infrared reflected polarized light and the second far infrared reflected polarized light.

The second computer 19 can obtain the depth information of the object 17 by processing the first far infrared reflected polarized light, obtain the contour information of the object 17 by processing the second far infrared reflected polarized light, and obtain a three dimensional image of the object 17 by combining the depth information and the contour information.

The far infrared imaging system 200 is similar to the far infrared imaging system 100 as described above, except that the far infrared imaging system 200 includes a single far infrared light source 11A, a single polarizer 12A, and further includes a rotator 13A.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A far infrared imaging system, comprising:
   a first far infrared polarized light generator, wherein the first far infrared polarized light generator comprises:
      a first far infrared light source adapted to emit a first far infrared light;
      a first polarizer on a first light emitting surface of the first far infrared light source, wherein the first polarizer comprises a first carbon nanotube structure comprising a plurality of first carbon nanotubes arranged substantially along a first direction, and the first carbon nanotube structure is configured to polarize the far infrared light emitted from the first far infrared light source and form a first far infrared polarized light, and a reflected first far infrared polarized light is formed when the first far infrared polarized light is reflected by an object; and
      a first heater adapted to heat the first carbon nanotube structure;
   a second far infrared polarized light generator, wherein the second far infrared polarized light generator comprises:
      a second far infrared light source configured to emit a second far infrared light;
      a second polarizer on a second light emitting surface of the second far infrared light source, wherein the second polarizer comprises a second carbon nanotube structure comprising a plurality of second carbon nanotubes arranged substantially along a second direction perpendicular to the first direction, and the second carbon nanotube structure is configured to polarize the second far infrared light emitted from the second far infrared light source and form a second far infrared polarized light, and a reflected second far infrared polarized light is formed when the second far infrared polarized light is reflected by the object; and
      a second heater adapted to heat the second carbon nanotube structure;
   a first receiving device, wherein the first receiving device comprises:
      a first polarization detector, wherein the first polarization detector and the first polarizer have a same polarization direction; and
      a first receiver comprising a first light incident surface, wherein the first polarization detector is located on the first light incident surface of the first receiver, and the first receiver is configured to receive the reflected first far infrared polarized light passes through the first polarization detector;
   a second receiving device, wherein the second receiving device comprises:
      a second polarization detector, wherein the second polarization detector and the second polarizer have a same polarization direction; and
      a second receiver comprising a second light incident surface, wherein the second polarization detector is located on the second light incident surface of the second receiver, and the second receiver if configure to receive the reflected second far infrared polarized light passes through the second polarization detector; and a computer electrically connected to each of the first receiver and the second receiver, wherein the computer is adapted to process information received by the first receiver and the second receiver.

2. The far infrared imaging system of claim 1, wherein the first polarizer further comprises a first frame defining an first opening, the first carbon nanotube structure is attached on the first frame to cover the first opening, and a middle portion of the first carbon nanotube structure is suspended through the first opening; the second polarizer further comprises a second frame defining an second opening, the second carbon nanotube structure is attached on the second frame to cover the second opening, and a middle portion of the second carbon nanotube structure is suspended through the second opening.

3. The far infrared imaging system of claim 1, wherein the first carbon nanotube structure comprises a first drawn carbon nanotube film, and the first drawn carbon nanotube film comprises the plurality of first carbon nanotubes joined end-to-end by van der Waals attractive force therebetween; and the second carbon nanotube structure comprises a second drawn carbon nanotube film, and the second drawn carbon nanotube film comprises the plurality of second carbon nanotubes joined end-to-end by van der Waals attractive force therebetween.

4. The far infrared imaging system of claim 1, wherein the first carbon nanotube structure comprises a plurality of first carbon nanotube wires substantially parallel to each other; and the second carbon nanotube structure comprises a plurality of second carbon nanotube wires substantially parallel to each other.

5. The far infrared imaging system of claim 1, wherein the plurality of first carbon nanotubes and the plurality of second carbon nanotubes are coated with a coating layer, and a material of the coating layer is selected from the group consisting of metal, metal oxide, metal nitride, metal carbide, metal sulfide, silicon oxide, silicon nitride, silicon carbide, and combination thereof.

6. The far infrared imaging system of claim 1, wherein the first heater comprises a first heating film, a first electrode, a second electrode, and a first power supply; and the second heater comprises a second heating film, a third electrode, a fourth electrode, and a second power supply.

7. The far infrared imaging system of claim 6, wherein the first heating film is the first carbon nanotube structure; and the second heating film is the second carbon nanotube structure.

8. The far infrared imaging system of claim 1, wherein the first far infrared polarized light generator further comprises a first vacuum chamber, and the first polarizer is located in the first vacuum chamber; and the second far infrared polarized light generator further comprises a second vacuum chamber, and the second polarizer is located in the second vacuum chamber.

9. The far infrared imaging system of claim 8, wherein the first far infrared light source and the first heater are located in the first vacuum chamber; and the second far infrared light source and the second heater are located in the second vacuum chamber.

10. The far infrared imaging system of claim 1, wherein the computer obtains a depth information of the object by processing the reflected first far infrared polarized light, obtains a contour information of the object by processing the reflected second far infrared polarized light, and obtains a three dimensional image of the object by combining the depth information and the contour information.

11. A far infrared imaging system, comprising:
a far infrared polarized light generator, wherein the far infrared polarized light generator comprises:
a far infrared light source adapted to emit a far infrared light;
a polarizer located on a light emitting surface of the far infrared light source, wherein the polarizer comprises a carbon nanotube structure comprising a plurality of carbon nanotubes arranged substantially along a same direction;
a rotator connected to the polarizer and adapted to change a polarization direction of the polarizer, so that the polarization direction of the polarizer switches between a first polarization direction and a second polarization direction perpendicular to the first polarization direction; when the polarizer has the first polarization direction, the far infrared light passes through the polarizer to form a first far infrared polarized light;
and when the polarizer has the second polarization direction, the far infrared light passes through the polarizer to form a second far infrared polarized light; and
a heater adapted to heat the carbon nanotube structure;
a first receiving device, wherein the first receiving device comprises:
a first polarization detector, wherein the first polarization detector and the first polarizer have a same polarization direction; and
a first receiver comprising a first light incident surface, wherein the first polarization detector is located on the first light incident surface of the first receiver, and the first receiver is configured to receive the first far infrared reflected polarized light passes through the first polarization detector;
a second receiving device, wherein the second receiving device comprises:
a second polarization detector, wherein the second polarization detector and the second polarizer have a same polarization direction; and
a second receiver comprising a second light incident surface, wherein the second polarization detector is located on the second light incident surface of the second receiver, and the second receiver is configured to receive the second far infrared reflected polarized light passes through the second polarization detector; and
a computer electrically connected to each of the first receiver and the second receiver, wherein the computer is adapted to process information received by the first receiver and the second receiver.

12. The far infrared imaging system of claim 11, wherein the polarizer further comprises a frame defining an opening, the carbon nanotube structure is attached on the frame to cover the opening, and a middle portion of the carbon nanotube structure is suspended through the opening.

13. The far infrared imaging system of claim 11, wherein the carbon nanotube structure comprises a drawn carbon nanotube film, and the drawn carbon nanotube film comprises the plurality of carbon nanotubes joined end-to-end by van der Waals attractive force therebetween.

14. The far infrared imaging system of claim 11, wherein the carbon nanotube structure comprises a plurality of carbon nanotube wires substantially parallel to each other.

15. The far infrared imaging system of claim 11, wherein the plurality of carbon nanotubes are coated with a coating layer, and a material of the coating layer is selected from the group consisting of metal, metal oxide, metal nitride, metal carbide, metal sulfide, silicon oxide, silicon nitride, silicon carbide, and combination thereof.

16. The far infrared imaging system of claim 11, wherein the heater comprises a heating film, a first electrode, a second electrode, and a power supply.

17. The far infrared imaging system of claim 16, wherein the heating film is the carbon nanotube structure.

18. The far infrared imaging system of claim 11, wherein the far infrared polarized light generator further comprises a vacuum chamber, and the polarizer is located in the vacuum chamber.

19. The far infrared imaging system of claim 18, wherein the far infrared light source and the heater are located in the vacuum chamber.

20. The far infrared imaging system of claim 11, wherein the computer obtains a depth information of an object by processing the first far infrared reflected polarized light, obtains a contour information of the object by processing the second far infrared reflected polarized light, and obtains a three dimensional image of the object by combining the depth information and the contour information.

* * * * *